US011606176B2

(12) United States Patent
Yang et al.

(10) Patent No.: US 11,606,176 B2
(45) Date of Patent: Mar. 14, 2023

(54) REFERENCE SIGNAL AND UPLINK CONTROL CHANNEL ASSOCIATION DESIGN

(71) Applicant: QUALCOMM Incorporated, San Diego, CA (US)

(72) Inventors: Wei Yang, San Diego, CA (US); Alexandros Manolakos, San Diego, CA (US); Jing Jiang, San Diego, CA (US); Yi Huang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/451,827

(22) Filed: Jun. 25, 2019

(65) Prior Publication Data
US 2020/0007294 A1 Jan. 2, 2020

(30) Foreign Application Priority Data

Jun. 29, 2018 (GR) .............................. 20180100299

(51) Int. Cl.
H04W 56/00 (2009.01)
H04L 5/00 (2006.01)
H04W 52/14 (2009.01)

(52) U.S. Cl.
CPC .......... H04L 5/0051 (2013.01); H04L 5/0094 (2013.01); H04W 52/146 (2013.01)

(58) Field of Classification Search
CPC .... H04L 5/0051; H04L 5/0094; H04L 52/146
(Continued)

(56) References Cited

U.S. PATENT DOCUMENTS

2014/0213315 A1\* 7/2014 Kim .................... H04W 52/325
455/522
2015/0180625 A1\* 6/2015 Park ...................... H04B 7/024
370/329

(Continued)

FOREIGN PATENT DOCUMENTS

WO WO-2019049096 A1 3/2019

OTHER PUBLICATIONS

Ericsson: "On UL Beam Indication", 3GPP Draft; R1-1718747_On UL Beam Indication, 3rd Generation Partnership Project (3GPP), Mobile Competence Centre, 650, Route Des Lucioles, F-06921 Sophia-Anti Polis Cedex, France, vol. RAN WG1, No. Prague, CZ; Oct. 9, 2017-Oct. 13, 2017, Oct. 8, 2017 (Oct. 8, 2017), 4 Pages, XP051341917, Retrieved from the Internet: URL: http://www.3gpp.org/ftp/Meetings_3GPP_SYNC/RAN1/Docs/ [retrieved on Oct. 8, 2017], Section 2.

(Continued)

Primary Examiner — Sai Ming Chan
(74) Attorney, Agent, or Firm — Holland & Hart LLP

(57) ABSTRACT

Methods, systems, and devices for wireless communications are described. A base station may configure a user equipment (UE) with quasi co-located (QCL) associations between a physical uplink control channel and a sounding reference signal (SRS) transmission for at least one time and frequency domain channel parameter. The UE may transmit, in accordance with the QCL association, a control channel transmission via the physical uplink control channel using an antenna port that is quasi co-located with at least one antenna port for transmitting the SRS transmission and transmit, in accordance with the QCL association, the SRS transmission via the at least one antenna port. In another example, the base station may configure the UE with an antenna port association between an SRS transmission and a physical uplink control channel. The UE may transmit the (Continued)

SRS transmission and a control channel transmission in accordance with the antenna port association.

33 Claims, 16 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2016/0197712 | A1* | 7/2016 | Sorrentino | H04L 27/2657 |
| | | | | 370/336 |
| 2018/0205480 | A1* | 7/2018 | Akkarakaran | H04W 72/0446 |
| 2018/0206132 | A1* | 7/2018 | Guo | H04W 72/0473 |
| 2019/0007175 | A1* | 1/2019 | Kwak | H04L 5/0053 |
| 2019/0075014 | A1* | 3/2019 | Zhou | H04W 72/042 |
| 2019/0149379 | A1* | 5/2019 | Xiong | H04L 5/0035 |
| | | | | 370/329 |
| 2019/0150124 | A1* | 5/2019 | Nogami | H04W 72/0446 |
| | | | | 370/330 |
| 2019/0191453 | A1* | 6/2019 | Xiong | H04L 5/0057 |
| 2019/0222357 | A1* | 7/2019 | Huang | H04W 72/0446 |
| 2019/0261329 | A1* | 8/2019 | Park | H04L 5/005 |
| 2019/0313348 | A1* | 10/2019 | MolavianJazi | H04W 52/365 |
| 2019/0357205 | A1* | 11/2019 | Li | H04L 27/2601 |
| 2020/0068497 | A1* | 2/2020 | Gong | H04W 52/325 |

OTHER PUBLICATIONS

Ericsson: "On Beam Indication, Measurement, and Reporting", 3GPP Draft; R1-1716350 On Beam Indication, Measurement, and Reporting, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017 Sep. 17, 2017, XP051339805, Retrieved from the Internet: URL:http://www.3gpp.org/ftp/Meetings_3GPP_SYNC/RAN1/Docs/ [retrieved on Sep. 17, 2017], section 3, 13 pages.

Ericsson: "On QCL", 3GPP Draft; R1-1708710, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15, 2017-May 19, 2017 May 6, 2017, XP051262607, Retrieved from the Internet: URL:http://www.3gpp.org/ftp/tsg_ran/WG1_RL1/TSGR1_89/Docs/ [retrieved on May 6, 2017], 6 pages, section 6.

International Search Report and Written Opinion—PCT/US2019/039208—ISA/EPO—dated Oct. 11, 2019.

* cited by examiner

RRC Message 210

PUCCH Message 215

SRS 220

REFERENCE SIGNAL AND UPLINK CONTROL CHANNEL ASSOCIATION DESIGN

CROSS REFERENCE

The present application for patent claims the benefit of Greece Provisional Patent Application No. 20180100299 by YANG et al., entitled "REFERENCE SIGNAL AND UPLINK CONTROL CHANNEL ASSOCIATION DESIGN," filed Jun. 29, 2018, assigned to the assignee hereof, and expressly incorporated herein.

BACKGROUND

The following relates generally to wireless communications, and more specifically to reference signal and uplink control channel association design.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some UEs may be capable of communications using multiple, different service types that may each have a different reliability requirement. Some service types may have stringent reliability or latency requirements. In some cases, a decrease in performance of decoding uplink control information at a base station may greatly impair communication throughput. When the base station is unable to successfully decode uplink control information transmitted by the UE, the base station may request that the UE retransmit the uplink control information. Retransmitting control information may incur latency that results in communications between the UE and base station unacceptably being unable to meet the stringent reliability or latency requirements. Conventional techniques for transmitting control information are deficient.

SUMMARY

The described techniques relate to improved methods, systems, devices, or apparatuses that support reference signal and uplink control channel association design. Generally, the described techniques provide for configuring a quasi co-location (QCL) association between a sounding reference signal (SRS) transmission and a physical uplink control channel (PUCCH) transmission to enhance PUCCH detection performance.

A base station may transmit a configuration message to a UE indicating a QCL association between a PUCCH and an SRS transmission for at least one time and frequency domain channel parameter. For example, the base station may configure the UE to associate the PUCCH resource and the SRS resource based on a Type A QCL association or a Type D QCL association, or both a Type A and Type D QCL association. A QCL association for the time and frequency characteristics may be referred to as Type A QCL association, and a QCL association for spatial domain filters, such as beam direction or beam width for beamformed transmissions, may be referred to as a Type D QCL. The UE may then, based on the QCL association, transmit PUCCH messages using an antenna port which is quasi co-located with an antenna port which is used to transmit the SRS transmissions. In some cases, the QCL associations and application of the QCL associations may have constraints based on service type, PUCCH format, uplink control information (UCI) type, or bandwidth. Because of the QCL association, the base station may assume that the received SRS transmission and PUCCH message are quasi co-located with respect to time and frequency characteristics, such as doppler shift, doppler spread, average delay, as well as delay spread. Knowledge of the QCL association may improve PUCCH decoding performance by the base station.

In some examples, a base station may transmit a configuration message to a UE indicating an antenna port association between an SRS transmission and a physical uplink control channel. The configuration message may configure the UE to transmit the SRS transmission and a PUCCH transmission via a same antenna port. The UE may transmit, in accordance with the antenna port association, the SRS transmission via an SRS resource and a control channel transmission via the physical uplink control channel. Because the UE may transmit the SRS transmission and the PUCCH transmission via a same antenna port, the base station may infer the instantaneous channel used to transmit the PUCCH message from the channel of the SRS transmission. Configuring the UE with an antenna port association may thus improve PUCCH decoding performance by the base station.

A method of wireless communication at a UE is described. The method may include receiving a configuration message indicating a quasi co-location (QCL) association between a physical uplink control channel and a SRS transmission for at least one time and frequency domain channel parameter, transmitting, in accordance with the QCL association, a control channel transmission via the physical uplink control channel using an antenna port that is quasi co-located with at least one antenna port for transmitting the SRS transmission, and transmitting, in accordance with the QCL association, the SRS transmission via the at least one antenna port.

An apparatus for wireless communication at a UE is described. The apparatus may include a processor, memory coupled with the processor, and instructions stored in the memory. The instructions may be executable by the processor to cause the apparatus to receive a configuration message indicating a quasi co-location (QCL) association between a physical uplink control channel and a SRS transmission for at least one time and frequency domain channel parameter, transmit, in accordance with the QCL association, a control channel transmission via the physical uplink control channel using an antenna port that is quasi co-located with at least one antenna port for transmitting the SRS transmission, and transmit, in accordance with the QCL association, the SRS transmission via the at least one antenna port.

Another apparatus for wireless communication at a UE is described. The apparatus may include means for receiving a configuration message indicating a quasi co-location (QCL) association between a physical uplink control channel and a SRS transmission for at least one time and frequency domain channel parameter, transmitting, in accordance with the QCL association, a control channel transmission via the physical uplink control channel using an antenna port that is quasi co-located with at least one antenna port for transmitting the SRS transmission, and transmitting, in accordance with the QCL association, the SRS transmission via the at least one antenna port.

A non-transitory computer-readable medium storing code for wireless communication at a UE is described. The code may include instructions executable by a processor to receive a configuration message indicating a quasi co-location (QCL) association between a physical uplink control channel and a SRS transmission for at least one time and frequency domain channel parameter, transmit, in accordance with the QCL association, a control channel transmission via the physical uplink control channel using an antenna port that is quasi co-located with at least one antenna port for transmitting the SRS transmission, and transmit, in accordance with the QCL association, the SRS transmission via the at least one antenna port.

In some examples of the method, apparatuses, and non-transitory computer-readable medium described herein, receiving the configuration message further may include operations, features, means, or instructions for receiving the configuration message indicating a second QCL association between the SRS transmission and the physical uplink control channel for at least one spatial domain filter parameter, where the control channel transmission and the SRS transmission may be each transmitted in accordance with the at least one spatial domain filter parameter.

In some examples of the method, apparatuses, and non-transitory computer-readable medium described herein, receiving the configuration message further may include operations, features, means, or instructions for receiving the configuration message indicating a second QCL association between a second SRS transmission and the physical uplink control channel for at least one spatial domain filter parameter, the second SRS transmission differing from the SRS transmission, where the control channel transmission and the second SRS transmission may be each transmitted in accordance with the at least one spatial domain filter parameter.

In some examples of the method, apparatuses, and non-transitory computer-readable medium described herein, receiving the configuration message further may include operations, features, means, or instructions for receiving the configuration message indicating a first service type of a set of different service types to which the QCL association applies.

In some examples of the method, apparatuses, and non-transitory computer-readable medium described herein, the first service type of the set of different service types may be configured to may have either a latency specification that may be lower than a latency specification for a second service type, a reliability specification that may be higher than a reliability specification for the second service type, or both.

In some examples of the method, apparatuses, and non-transitory computer-readable medium described herein, receiving the configuration message further may include operations, features, means, or instructions for receiving the configuration message indicating at least one type of physical uplink control channel format of a set of different types of physical uplink control channel formats to which the QCL association applies.

In some examples of the method, apparatuses, and non-transitory computer-readable medium described herein, the at least one type of physical uplink control channel format may be configured to include an acknowledgement, a negative acknowledgement, a scheduling request, or any combination thereof.

In some examples of the method, apparatuses, and non-transitory computer-readable medium described herein, the at least one type of physical uplink control channel format may be configured for a first service type having a latency specification that may be lower than a latency specification and a reliability specification that may be higher than a reliability specification for a second service type, and may be not configured for the second service type.

In some examples of the method, apparatuses, and non-transitory computer-readable medium described herein, receiving the configuration message further may include operations, features, means, or instructions for receiving the configuration message indicating at least one type of uplink control information of a set of different types of uplink control information to which the QCL association applies.

In some examples of the method, apparatuses, and non-transitory computer-readable medium described herein, the at least one type of uplink control information may be configured to include an acknowledgement, a negative acknowledgement, a scheduling request, or any combination thereof.

In some examples of the method, apparatuses, and non-transitory computer-readable medium described herein, receiving the configuration message further may include operations, features, means, or instructions for receiving the configuration message indicating to apply the QCL association when the physical uplink control channel may have at least a defined number of resource blocks.

In some examples of the method, apparatuses, and non-transitory computer-readable medium described herein, receiving the configuration message further may include operations, features, means, or instructions for receiving the configuration message indicating at least one physical uplink control channel resource of a set of different physical uplink control channel resources to which the QCL association applies.

In some examples of the method, apparatuses, and non-transitory computer-readable medium described herein, the at least one time and frequency domain channel parameter includes at least one of a doppler shift, a doppler spread, an average delay, a delay spread, or any combination thereof.

In some examples of the method, apparatuses, and non-transitory computer-readable medium described herein, the configuration message may be received via radio resource control signaling.

In some examples of the method, apparatuses, and non-transitory computer-readable medium described herein, the at least one time and frequency domain channel parameter may be a large-scale time and frequency domain channel parameter.

A method of wireless communication at a base station is described. The method may include transmitting a configuration message indicating a quasi co-location (QCL) association between a physical uplink control channel and a SRS transmission for at least one time and frequency domain channel parameter and receiving, in accordance with the QCL association, the SRS transmission via an SRS resource and a control channel transmission via the physical uplink control channel.

An apparatus for wireless communication at a base station is described. The apparatus may include a processor, memory coupled with the processor, and instructions stored in the memory. The instructions may be executable by the processor to cause the apparatus to transmit a configuration message indicating a quasi co-location (QCL) association between a physical uplink control channel and a SRS transmission for at least one time and frequency domain channel parameter and receive, in accordance with the QCL association, the SRS transmission via an SRS resource and a control channel transmission via the physical uplink control channel.

Another apparatus for wireless communication at a base station is described. The apparatus may include means for transmitting a configuration message indicating a quasi co-location (QCL) association between a physical uplink control channel and a SRS transmission for at least one time and frequency domain channel parameter and receiving, in accordance with the QCL association, the SRS transmission via an SRS resource and a control channel transmission via the physical uplink control channel.

A non-transitory computer-readable medium storing code for wireless communication at a base station is described. The code may include instructions executable by a processor to transmit a configuration message indicating a quasi co-location (QCL) association between a physical uplink control channel and a SRS transmission for at least one time and frequency domain channel parameter and receive, in accordance with the QCL association, the SRS transmission via an SRS resource and a control channel transmission via the physical uplink control channel.

Some examples of the method, apparatuses, and non-transitory computer-readable medium described herein may further include operations, features, means, or instructions for determining a power delay profile for the physical layer uplink control channel from the SRS transmission, determining a channel estimate for the physical uplink control channel based on the power delay profile and demodulating the control channel transmission based on the channel estimate.

In some examples of the method, apparatuses, and non-transitory computer-readable medium described herein, transmitting the configuration message further may include operations, features, means, or instructions for transmitting the configuration message indicating a second QCL association between the SRS transmission and the physical uplink control channel for at least one spatial domain filter parameter.

In some examples of the method, apparatuses, and non-transitory computer-readable medium described herein, transmitting the configuration message further may include operations, features, means, or instructions for transmitting the configuration message indicating a second QCL association between a second SRS transmission and the physical uplink control channel for at least one spatial domain filter parameter, the second SRS transmission differing from the SRS transmission.

In some examples of the method, apparatuses, and non-transitory computer-readable medium described herein, transmitting the configuration message further may include operations, features, means, or instructions for transmitting the configuration message indicating a first service type of a set of different service types to which the QCL association applies.

In some examples of the method, apparatuses, and non-transitory computer-readable medium described herein, the first service type may have a latency specification that may be lower than a latency specification and a reliability specification that may be higher than a reliability specification for a second service type of the set of different service types.

In some examples of the method, apparatuses, and non-transitory computer-readable medium described herein, transmitting the configuration message further may include operations, features, means, or instructions for transmitting the configuration message indicating at least one type of physical uplink control channel format of a set of different types of physical uplink control channel formats to which the QCL association applies.

In some examples of the method, apparatuses, and non-transitory computer-readable medium described herein, the at least one type of physical uplink control channel format may be configured to include an acknowledgement, a negative acknowledgement, a scheduling request, or any combination thereof.

In some examples of the method, apparatuses, and non-transitory computer-readable medium described herein, the at least one physical uplink control channel format type may be configured for a first service type having a latency specification that may be lower than a latency specification and a reliability specification that may be higher than a reliability specification for a second service type, and may be not configured for the second service type.

In some examples of the method, apparatuses, and non-transitory computer-readable medium described herein, transmitting the configuration message further may include operations, features, means, or instructions for transmitting the configuration message indicating at least one type of uplink control information of a set of different types of uplink control information to which the QCL association applies.

In some examples of the method, apparatuses, and non-transitory computer-readable medium described herein, the at least one type of uplink control information may be configured to include an acknowledgement, a negative acknowledgement, a scheduling request, or any combination thereof.

In some examples of the method, apparatuses, and non-transitory computer-readable medium described herein, transmitting the configuration message further may include operations, features, means, or instructions for transmitting the configuration message indicating to apply the QCL association when the physical uplink control channel may have a least a defined number of resource blocks.

In some examples of the method, apparatuses, and non-transitory computer-readable medium described herein, transmitting the configuration message further may include operations, features, means, or instructions for transmitting the configuration message indicating at least one physical uplink control channel resource of a set of different physical uplink control channel resources to which the QCL association applies.

In some examples of the method, apparatuses, and non-transitory computer-readable medium described herein, the at least one time and frequency domain channel parameter includes at least one of a doppler shift, a doppler spread, an average delay, a delay spread, or any combination thereof.

In some examples of the method, apparatuses, and non-transitory computer-readable medium described herein, the configuration message may be transmitted via radio resource control signaling.

In some examples of the method, apparatuses, and non-transitory computer-readable medium described herein, the at least one time and frequency domain channel parameter may be a large-scale time and frequency domain channel parameter.

A method of wireless communication at a UE is described. The method may include receiving a configuration message indicating an antenna port association between a SRS transmission and a physical uplink control channel and transmitting, in accordance with the antenna port association, the SRS transmission via an SRS resource and a control channel transmission via the physical uplink control channel.

An apparatus for wireless communication at a UE is described. The apparatus may include a processor, memory coupled with the processor, and instructions stored in the memory. The instructions may be executable by the processor to cause the apparatus to receive a configuration message indicating an antenna port association between a SRS transmission and a physical uplink control channel and transmit, in accordance with the antenna port association, the SRS transmission via an SRS resource and a control channel transmission via the physical uplink control channel.

Another apparatus for wireless communication at a UE is described. The apparatus may include means for receiving a configuration message indicating an antenna port association between a SRS transmission and a physical uplink control channel and transmitting, in accordance with the antenna port association, the SRS transmission via an SRS resource and a control channel transmission via the physical uplink control channel.

A non-transitory computer-readable medium storing code for wireless communication at a UE is described. The code may include instructions executable by a processor to receive a configuration message indicating an antenna port association between a SRS transmission and a physical uplink control channel and transmit, in accordance with the antenna port association, the SRS transmission via an SRS resource and a control channel transmission via the physical uplink control channel.

In some examples of the method, apparatuses, and non-transitory computer-readable medium described herein, receiving the configuration message may include operations, features, means, or instructions for indicating an antenna port association between the SRS resource and a physical uplink control channel resource, and transmitting, in accordance with the antenna port association, the SRS transmission on the SRS resource and the control channel transmission on the PUCCH resource.

In some examples of the method, apparatuses, and non-transitory computer-readable medium described herein, receiving the configuration message may include operations, features, means, or instructions for receiving the configuration message to configure the UE to maintain phase coherence between the SRS transmission and the control channel transmission.

In some examples of the method, apparatuses, and non-transitory computer-readable medium described herein, the antenna port association indicates that the UE may be to transmit the SRS transmission and the control channel transmission via a same antenna port, and where the transmitting further may include operations, features, means, or instructions for transmitting the SRS transmission and the control channel transmission via the same antenna port.

In some examples of the method, apparatuses, and non-transitory computer-readable medium described herein, each of the SRS transmission and the control channel transmission may be transmitted via the same antenna port within a defined amount of time.

In some examples of the method, apparatuses, and non-transitory computer-readable medium described herein, the defined amount of time may be based on a numerology.

In some examples of the method, apparatuses, and non-transitory computer-readable medium described herein, the transmitting further may include operations, features, means, or instructions for transmitting the SRS transmission using a first transmission power and the control channel transmission using a second transmission power, where a difference between the first transmission power and the second transmission power satisfies a threshold.

In some examples of the method, apparatuses, and non-transitory computer-readable medium described herein, transmitting the SRS transmission using the first transmission power and the control channel transmission using the second transmission power further may include operations, features, means, or instructions for adjusting the first transmission power to make the difference between the first transmission power and the second transmission power satisfy the threshold.

In some examples of the method, apparatuses, and non-transitory computer-readable medium described herein, the control channel transmission may be a scheduling request transmission indicating that the UE may have uplink data available for transmission, and the adjusting the first transmission power may be based on the scheduling request transmission indicating that the UE may have uplink data available for transmission.

In some examples of the method, apparatuses, and non-transitory computer-readable medium described herein, the transmitting further may include operations, features, means, or instructions for transmitting the SRS transmission using a first bandwidth and the control channel transmission using a second bandwidth, where a difference between the first bandwidth and the second bandwidth satisfies a threshold.

In some examples of the method, apparatuses, and non-transitory computer-readable medium described herein, transmitting the SRS transmission using the first bandwidth and the control channel transmission using the second bandwidth further may include operations, features, means, or instructions for adjusting the first bandwidth to make the difference between the first bandwidth and the second bandwidth satisfy the threshold.

In some examples of the method, apparatuses, and non-transitory computer-readable medium described herein, the control channel transmission may be a scheduling request transmission indicating that the UE may have uplink data available for transmission, and the adjusting the first bandwidth may be based on the scheduling request transmission indicating that the UE may have uplink data available for transmission.

Some examples of the method, apparatuses, and non-transitory computer-readable medium described herein may further include operations, features, means, or instructions for receiving downlink control information that triggers transmission of the SRS transmission and the control channel transmission.

Some examples of the method, apparatuses, and non-transitory computer-readable medium described herein may further include operations, features, means, or instructions for transmitting the SRS transmission and the control channel transmission in accordance with the antenna port association may be based on the downlink control information triggering transmission of the SRS transmission and the control channel transmission.

In some examples of the method, apparatuses, and non-transitory computer-readable medium described herein, the downlink control information triggering both the SRS transmission and the control channel transmission indicates the antenna port association to the UE.

In some examples of the method, apparatuses, and non-transitory computer-readable medium described herein, the downlink control information indicates an order in which to transmit the SRS transmission relative to the control channel transmission.

In some examples of the method, apparatuses, and non-transitory computer-readable medium described herein, the SRS transmission may be an aperiodic SRS transmission.

Some examples of the method, apparatuses, and non-transitory computer-readable medium described herein may further include operations, features, means, or instructions for identifying that an uplink transmission or a downlink transmission occurs between a second SRS transmission and a second control channel transmission, determining not to apply the antenna port association based on the identifying, and transmitting the second SRS transmission and the second control channel transmission based on the determining.

A method of wireless communication at a base station is described. The method may include transmitting a configuration message indicating an antenna port association between a SRS transmission and a physical uplink control channel and receiving, in accordance with the antenna port association, the SRS transmission via an SRS resource and a control channel transmission via the physical uplink control channel.

An apparatus for wireless communication at a base station is described. The apparatus may include a processor, memory coupled with the processor, and instructions stored in the memory. The instructions may be executable by the processor to cause the apparatus to transmit a configuration message indicating an antenna port association between a SRS transmission and a physical uplink control channel and receive, in accordance with the antenna port association, the SRS transmission via an SRS resource and a control channel transmission via the physical uplink control channel.

Another apparatus for wireless communication at a base station is described. The apparatus may include means for transmitting a configuration message indicating an antenna port association between a SRS transmission and a physical uplink control channel and receiving, in accordance with the antenna port association, the SRS transmission via an SRS resource and a control channel transmission via the physical uplink control channel.

A non-transitory computer-readable medium storing code for wireless communication at a base station is described. The code may include instructions executable by a processor to transmit a configuration message indicating an antenna port association between a SRS transmission and a physical uplink control channel and receive, in accordance with the antenna port association, the SRS transmission via an SRS resource and a control channel transmission via the physical uplink control channel.

In some examples of the method, apparatuses, and non-transitory computer-readable medium described herein, transmitting the configuration message may include operations, features, means, or instructions for transmitting the configuration message to configure a UE to maintain phase coherence between the SRS transmission and the control channel transmission.

Some examples of the method, apparatuses, and non-transitory computer-readable medium described herein may further include operations, features, means, or instructions for determining a first channel estimate for the SRS transmission, determining a second channel estimate for the physical uplink control channel based on the first channel estimate and demodulating the control channel transmission based on the second channel estimate.

In some examples of the method, apparatuses, and non-transitory computer-readable medium described herein, determining the second channel estimate further may include operations, features, means, or instructions for determining the second channel estimate based on a relationship between a first transmission power of the SRS transmission and a second transmission power of the control channel transmission.

Some examples of the method, apparatuses, and non-transitory computer-readable medium described herein may further include operations, features, means, or instructions for controlling channel transmission may be a scheduling request transmission indicating that the UE may have uplink data available for transmission, and the relationship between the first transmission power and the second transmission power may be based on the scheduling request transmission indicating that the UE may have uplink data available for transmission.

In some examples of the method, apparatuses, and non-transitory computer-readable medium described herein, determining the second channel estimate further may include operations, features, means, or instructions for determining the second channel estimate based on a relationship between a first bandwidth of the SRS transmission and a second bandwidth of the control channel transmission.

In some examples of the method, apparatuses, and non-transitory computer-readable medium described herein, the control channel transmission may be a scheduling request transmission indicating that the UE may have uplink data available for transmission, and the relationship between the first bandwidth and the second bandwidth may be based on the scheduling request transmission indicating that the UE may have uplink data available for transmission.

In some examples of the method, apparatuses, and non-transitory computer-readable medium described herein, the antenna port association indicates that a UE may be to transmit the SRS transmission and the control channel transmission via a same antenna port.

In some examples of the method, apparatuses, and non-transitory computer-readable medium described herein, the antenna port association indicates that a UE may be to transmit the SRS transmission and the control channel transmission via a same antenna port within a defined amount of time, and where the receiving further may include operations, features, means, or instructions for receiving each of the SRS transmission and the control channel transmission within the defined amount of time.

In some examples of the method, apparatuses, and non-transitory computer-readable medium described herein, the defined amount of time may be based on a numerology.

Some examples of the method, apparatuses, and non-transitory computer-readable medium described herein may further include operations, features, means, or instructions for transmitting downlink control information to trigger transmission of the SRS transmission and the control channel transmission.

In some examples of the method, apparatuses, and non-transitory computer-readable medium described herein, the SRS transmission may be an aperiodic SRS transmission.

In some examples of the method, apparatuses, and non-transitory computer-readable medium described herein, the downlink control information indicates an order in which to transmit the SRS transmission relative to the control channel transmission.

In some examples of the method, apparatuses, and non-transitory computer-readable medium described herein, the configuration message may be transmitted via radio resource control signaling.

DETAILED DESCRIPTION

Figure 1:
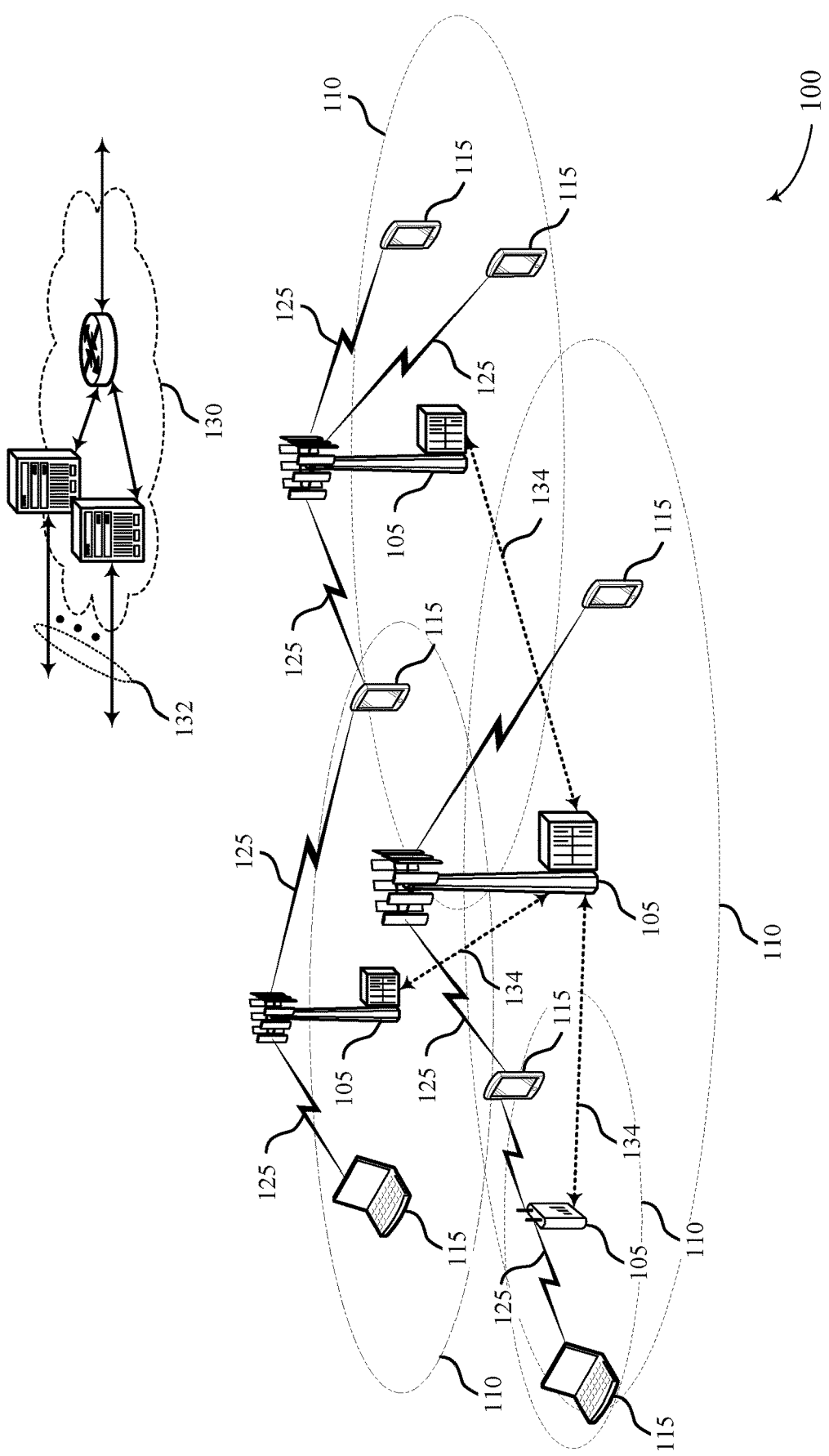
FIG. 1 illustrates an example of a system for wireless communications that supports reference signal and uplink control channel association design in accordance with aspects of the present disclosure.

The described techniques may provide for configuring a quasi co-location (QCL) association between a sounding reference signal (SRS) transmission and a physical uplink control channel (PUCCH) transmission to enhance PUCCH detection performance. Moreover, the described techniques may provide for configuring an antenna port association between an SRS transmission and a PUCCH transmission to enhance PUCCH detection performance.

A user equipment (UE) may transmit reference signals to a base station, which may assist the base station in evaluating channel quality and uplink transmission timing characteristics. As an example, a UE may transmit an SRS transmission to a base station in one of the last symbol periods of a slot. The SRS transmission may be transmitted on a frequency bandwidth which is also used to transmit uplink control information (UCI) (e.g., on a physical uplink control channel (PUCCH)), and data (e.g., before or after the SRS transmission). The base station may use the SRS transmission to determine the channel quality of the uplink path for uplink transmissions on the frequency bandwidth used to transmit the SRS transmission. In some cases, the UE may transmit an SRS transmission at multiple different frequency locations to provide the base station with channel quality estimates for the multiple different frequencies. The base station may allocate resources in a frequency region to the UE based on the determined channel quality characteristics of the different frequency regions.

In some cases, the UE and the base station may communicate using beamforming techniques. The UE may directionally transmit toward the base station using a beam pointed toward the base station, and the base station may receive the transmissions using a directional receive beam pointed toward the UE. In some cases, an antenna port of the UE used to transmit PUCCH messages and an antenna port used to transmit an SRS transmission may use the same spatial filters (e.g., a same transmit beam may be used to transmit a PUCCH message and an SRS transmission).

For example, the PUCCH messages and the SRS transmission may be transmitted using the same beam. Two antenna ports may be considered quasi co-located (QCL) if the large-scale properties of the channel over which a symbol on one antenna port is conveyed can be inferred from the channel over which a symbol on the other antenna port is conveyed. Being quasi co-located may help power control and PUCCH detection at a receiver, such as a gNB. Generally, if two transmissions are quasi co-located, the receiver can assume the transmissions are transmitted from roughly the same set of antennas. A UE and a base station may implement techniques described herein to configure a QCL association between an antenna port used to transmit PUCCH messages and an antenna port used to transmit an SRS transmission.

For example, the base station may assume, based on a configured QCL association, that a received SRS transmission and PUCCH transmission are quasi co-located with respect to time and frequency characteristics, such as doppler shift, doppler spread, average delay and delay spread. A QCL association for the time and frequency characteristics may be referred to as a Type A QCL association, where a QCL association for spatial filters may be referred to as a Type D QCL. Decoding the PUCCH message based on the QCL association may improve the decoding rate of the PUCCH message at the base station.

The base station may configure the UE with one or more QCL associations as part of configuring a PUCCH resource, and the configuration may tie the SRS resource to the PUCCH resource based on the association. For example, the base station may configure the UE to associate the PUCCH resource and the SRS resource based on a Type A QCL association or a Type D QCL association, or both a Type A and Type D QCL association. In some cases, the base station may configure the UE to associate the PUCCH resource with a first SRS resource based on a Type A QCL association and associate with a second SRS resource based on a Type D QCL association. The UE may transmit, in accordance with the one or more QCL associations, PUCCH messages using an antenna port which is quasi co-located with an antenna port which is used to transmit the SRS transmissions. In some cases, the QCL associations and application of the QCL associations may have constraints based on service type, PUCCH format, UCI type, or bandwidth.

In some examples, the UE may transmit an SRS transmission and a PUCCH message from a same antenna port, and the receiver (e.g., base station) may infer the instantaneous channel used to transmit the PUCCH message from the channel of the SRS transmission. This example may be referred to as antenna port association. In this example, the UE may maintain phase coherence between transmitting the SRS transmission and the PUCCH message to allow the receiver to perform coherent processing for the PUCCH. In some cases, the antenna port association may be used if the time gap between transmitting the SRS transmission and the PUCCH message is smaller than a threshold time gap. The UE may align the transmission power of the SRS transmission and the PUCCH message and, in some cases, may adjust the SRS bandwidth to align with the PUCCH bandwidth. The antenna port association may also be configured by the base station, for example by transmitting a radio resource control (RRC) message to the UE when configuring the PUCCH resources.

Aspects of the disclosure are initially described in the context of a wireless communications system. Aspects of the disclosure are further illustrated by and described with reference to apparatus diagrams, system diagrams, and flowcharts that relate to reference signal and uplink control channel association design.

FIG. 1 illustrates an example of a wireless communications system 100 that supports reference signal and uplink control channel association design in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

The base station 105 may configure the UE 115 with one or more QCL associations as part of configuring a PUCCH resource, and the configuration may tie the SRS resource to the PUCCH resource based on the association. For example, the base station 105 may configure the UE 115 to associate the PUCCH resource and the SRS resource based on a Type A QCL association or a Type D QCL association, or both a Type A and Type D QCL association.

A UE 115 may transmit, in accordance the with one or more QCL associations, an SRS transmission to a base station 105 on a frequency bandwidth which is also used to transmit PUCCH messages. The UE 115 may then transmit PUCCH messages using an antenna port which is quasi co-located with an antenna port which is used to transmit the SRS transmissions. In some cases, the QCL associations and application of the QCL associations may have constraints based on service type, PUCCH format, UCI type, or bandwidth. The base station 105 may assume, based on the one or more QCL associations, that the received SRS transmission and PUCCH messages are quasi co-located with respect to frequency characteristics, such as doppler shift and doppler spread, as well as time characteristics, such as average delay and delay spread. A QCL association for the time and frequency characteristics may be referred to as Type A QCL association, and a QCL association for spatial domain filters, such as beam direction or beam width for beamformed transmissions, may be referred to as a Type D QCL. Decoding the PUCCH message based on the QCL associations may improve the decoding rate of the PUCCH message at the base station. In another example, the UE 115 may transmit an SRS transmission and a PUCCH message from the same antenna port, and the base station 105 may infer the instantaneous channel used to transmit the PUCCH message from the channel of the SRS transmission.

Figure 2:
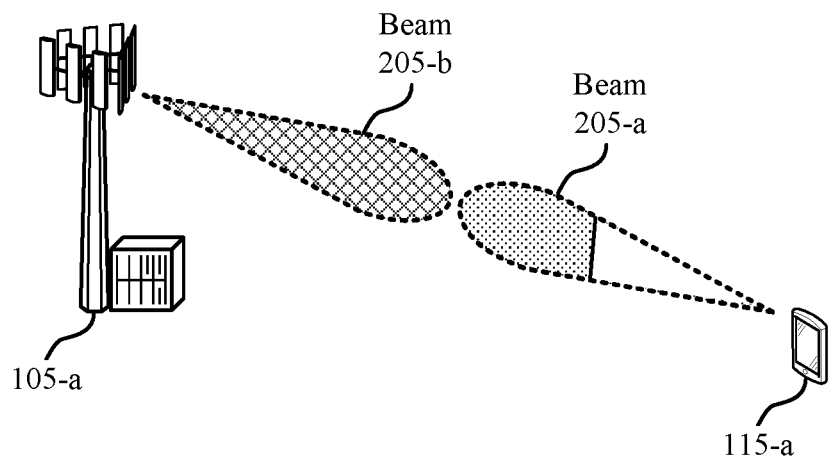
FIG. 2 illustrates an example of a system for wireless communications that supports reference signal and uplink control channel association design in accordance with aspects of the present disclosure.
Figure 2:
Figure 2:
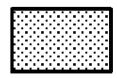
Figure 2:

FIG. 2 illustrates an example of a wireless communications system 200 that supports reference signal and uplink control channel association design in accordance with aspects of the present disclosure. In some examples, wireless communications system 200 may implement aspects of wireless communications system 100. The wireless communications system 200 includes UE 115-a and base station 105-a, which may be respective examples of a UE 115 and a base station 105 as described in FIG. 1.

UE 115-a and base station 105-a may communicate using beamforming techniques. For example, UE 115-a may directionally transmit to base station 105-a using a transmit beam 205-a pointed toward base station 105-a, and base station 105-a may receive the transmissions using a receive beam 205-b pointed toward UE 115-a. In some cases, UE 115-a may be capable of communications using multiple different services types. For example, UE 115-a may be capable of enhanced mobile broadband (eMBB) communications as well as low latency communications such as ultra-reliable low latency communications (URLLC). In some cases, some service types may have more stringent reliability requirements for PUCCH than others. As such, techniques described herein enhance PUCCH detection and decoding rates to improve reliability. In some example, techniques described herein improve PUCCH detection performance at a base station 105, such as base station 105-a.

UE 115-a may transmit reference signals to base station 105-a, which may assist base station 105-a in evaluating uplink channel quality and uplink transmission timing characteristics. As an example, UE 115-a may transmit an SRS transmission 220 to base station 105-a in one of the last symbol periods of a slot. The SRS transmission 220 may be transmitted on a frequency bandwidth which is also used to transmit control information, for example in a PUCCH message 215 (e.g., a control channel transmission via a PUCCH), and data, for example on a physical uplink shared channel (PUSCH). In some cases, the SRS transmission 220 may be transmitted after a PUCCH message 215, or the SRS transmission 220 may be transmitted before a PUCCH message 215 (e.g., in a following slot). Base station 105-a may use the SRS transmission 220 to determine the channel quality of the uplink path (e.g., on the transmit beam 205-a) for uplink transmissions on the frequency bandwidth used to transmit the SRS transmission 220. In some cases, base station 105-a may receive an SRS transmission 220 at multiple different frequency locations, which provides base station 105-a with channel quality estimates for the multiple different frequencies. In some cases, UE 115-a may transmit an SRS transmission 220 at multiple different frequency locations. Base station 105-a may allocate resources in a frequency region to UE 115-a based on the determined channel quality characteristics of the different frequency regions.

Base station 105-a may transmit an RRC message 210 to establish an RRC connection with UE 115-a, and base station 105-a may configure resources for PUCCH during the RRC connection establishment. In some cases, base station 105-a may transmit RRC parameters in an RRC message 210, which may update the configuration for the PUCCH (e.g., semi-statically configure the UE 115-a with the RRC parameters). Base station 105-a may implement techniques to configure UE 115-a with one or more QCL associations between a channel for SRS and a channel for PUCCH messages.

Two antenna ports may be considered quasi co-located if the large-scale properties of the channel over which a symbol on one antenna port is conveyed can be inferred from the channel over which a symbol on the other antenna port is conveyed. Generally, if the doppler shift and the doppler spread of two uplink channels are approximately the same, base station 105-a may consider the two uplink channels to have approximately the same time domain channel parameter(s). Similarly, if the two channels have approximately the same average delay and delay spread, base station 105-a may consider the two channels to have approximately the same frequency domain channel parameter(s). Thus, if a channel used to transmit PUCCH messages has a QCL association for one or more time and frequency domain channel parameters with a channel used to transmit SRS, base station 105-a may consider the two channels to have approximately the same time and frequency parameters, which may assist base station 105-a in estimating the channels for the PUCCH transmission.

Base station 105-a may configure UE 115-a with one or more QCL associations between the SRS transmission and the PUCCH. In some cases, base station 105-a may configure UE 115-a with one or more QCL associations when configuring the PUCCH resources or semi-statically updating the PUCCH configuration. For example, base station 105-a may configure UE 115-a to quasi co-locate an antenna port used to transmit the PUCCH message 215 on the PUCCH resources with an antenna port used to transmit the SRS transmission 220 on an SRS resource with respect to time and frequency parameters, spatial domain filtering parameters, or both. In some cases, base station 105-a may configure UE 105-a to associate the PUCCH with a first SRS resource based on at least one of the frequency and time parameters and associate the PUCCH with a second SRS resource based on spatial domain parameters.

In some examples, a QCL association and indication may depend on a PUCCH resource. For instance, a QCL association may be configured for some PUCCH resource(s) but not other PUCCH resource(s). In an example, each PUCCH message may be transmitted via one PUCCH resource. The PUCCH resource may indicate the time, frequency, and code domain resource for a PUCCH transmission. In the RRC configuration state, base station 105-a may configure a set of PUCCH resources for a potential PUCCH transmission. For each PUCCH transmission, the PUCCH resource could be either dynamically indicated by base station 105-a through downlink control information (DCI) (e.g., in the case of ACK/NACK feedback) or be semi-statically configured (e.g., in the case of periodic channel state information (CSI) feedback). By allowing different QCL relations for different PUCCH resources, base station 105-a may be able to schedule PUCCH messages 215 with different QCL associations (e.g., different QCL conditions). This may also be used to distinguish low latency PUCCH (e.g., URLLC PUCCH) from eMBB PUCCH. For example, low latency PUCCH may be transmitted on a PUCCH resource with one QCL association (e.g., one QCL condition), and eMBB PUCCH may be transmitted on a PUCCH resource with a different QCL association (e.g., different QCL condition).

Based on the configuration, UE 115-a may transmit the PUCCH message 215 using antenna ports that are quasi co-located with antenna ports used to transmit the SRS transmission 220. Base station 105-a may determine that the SRS transmission 220 and the PUCCH message 215 are quasi co-located with respect to time and frequency parameters, which may assist base station 105-a in decoding the PUCCH message 215. The large-scale properties of the SRS may be used by base station 105-a to generate a channel estimate for the PUCCH message 215 when demodulating the PUCCH message 215. An example of a spatial domain filtering parameter may be, for example, beam direction or beam width.

A QCL association for both the time and frequency characteristics may be referred to as a Type A QCL association, where a QCL association for spatial domain filters may be referred to as a Type D QCL association. Base station 105-a may configure UE 115-a with the QCL associations as part of configuring, re-configuring, or updating a PUCCH resource, for example by transmitting an RRC message 210. The configuration may tie the PUCCH resource to one or more SRS resources based on the association. If the PUCCH is QCL associated for time and frequency characteristics, UE 115-a may transmit a PUCCH message on an antenna port that is quasi co-located with the antenna ports used for the transmission of an SRS transmission with respect to one or more time and frequency domain channel parameters (e.g., doppler shift, doppler spread, delay shift, delay spread, or any combination thereof). The corresponding SRS may be indicated in RRC as part of PUCCH configurations. Configuring a UE 115 with QCL associations is described in more detail in FIG. 3.

In some cases, an antenna port of UE 115-a used to transmit a PUCCH message 215 and an antenna port used to transmit an SRS transmission 220 may use the same spatial domain filters. For example, the PUCCH message 215 and the SRS transmission 220 may be transmitted using the same transmit beam 205-a.

In another example, UE 115-a may transmit an SRS transmission 220 and a PUCCH message 215 from the same antenna port, and base station 105-a may infer the instantaneous channel used to transmit the PUCCH message 215 from the channel of the SRS transmission 220. Inferring the instantaneous channel used to transmit the PUCCH message 215 may include using the large-scale parameters of the SRS transmission 220 to generate a channel estimate for the PUCCH message 215 when demodulating the PUCCH message 215.

In this example, UE 115-a may maintain phase coherence between transmitting the SRS transmission 220 and the PUCCH message 215. In some cases, the antenna port association may be used if the time gap between transmitting the SRS transmission 220 and the PUCCH message 215 is lower than a threshold time gap, where the duration of the time gap corresponds to the amount of time (e.g., a minimum amount of time) for which the UE 115-a is to maintain phase coherence. UE 115-a may align the transmission power of the SRS transmission 220 and the PUCCH message 215 and, in some cases, may adjust the SRS bandwidth to align with the PUCCH bandwidth.

The antenna port association may also be configured by base station 105-a, for example by transmitting an RRC message 210 to UE 115-a when configuring, re-configuring, or updating the PUCCH configuration. In some cases, UE 115-c may only adapt SRS power or SRS bandwidth if the PUCCH message 215 is a scheduling request that is positive (e.g., indicating that UE 115-a has uplink information to transmit). A nominal SRS transmission may be transmitted when the scheduling request is negative (e.g., indicating that UE 115-a does not currently have uplink information to transmit). In some cases, an antenna port association may be conveyed in a configuration message which may come at an SRS-PUCCH resource level. Thus, if UE 115-a is configured or indicated to transmit a PUCCH on a particular resource that has an antenna port association with an SRS resource, then UE 115-*a* may transmit the SRS 220 and the PUCCH 215 according to the antenna port association between the two resources. Techniques for antenna port association are described in more detail in FIG. 4.

In some cases, UE 115-*a* may receive downlink control information to trigger transmission of the SRS transmission 220 and the PUCCH message 215 via a same antenna port. In some cases, a same downlink control information may trigger both the SRS transmission and the control channel transmission (e.g., triggering for an SRS transmission may occur in the same downlink control information message as triggering for the control channel transmission). In other cases, the downlink control information may trigger either the SRS transmission or the control channel transmission. In some cases, receiving the antenna port association may be based on the SRS and the PUCCH transmission being triggered in the same downlink control information. In one example, base station 105-*a* may use downlink control information to jointly trigger aperiodic SRS and PUCCH messages (e.g., an acknowledgment (ACK) or negative acknowledgment (NACK)). The SRS transmission 220 may serve as an additional demodulation reference signal for the PUCCH message 215. In some cases, the downlink control information may indicate whether to transmit the SRS transmission 220 before or after the PUCCH message 215.

Figure 3:
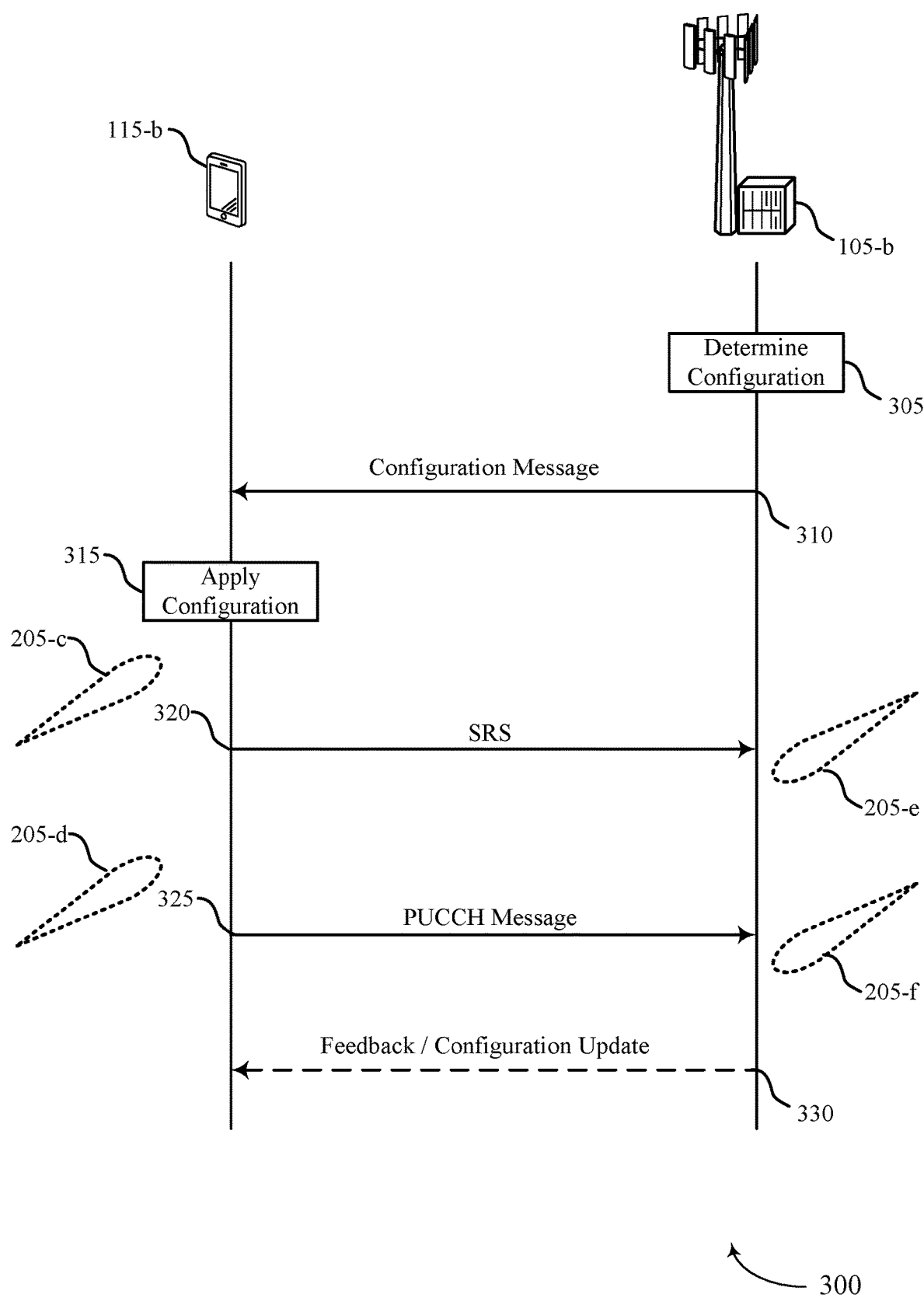
FIG. 3 illustrates an example of a process flow that supports reference signal and uplink control channel association design in accordance with aspects of the present disclosure.

FIG. 3 illustrates an example of a process flow 300 that supports reference signal and uplink control channel association design in accordance with aspects of the present disclosure. In some examples, process flow 300 may implement aspects of wireless communications system 100.

Process flow 300 includes UE 115-*b* and base station 105-*b*, which may be respective examples of a UE 115 and a base station 105 as described herein. As described in FIG. 2, UE 115-*b* and base station 105-*b* may communicate using beamforming techniques. For example, UE 115-*b* may directionally transmit to base station 105-*b* using a beam 205 pointed toward base station 105-*b*, and base station 105-*b* may receive the transmissions using a receive beam 205 pointed toward UE 115-*b*. In some cases, UE 115-*b* may be capable of communications using multiple different services types. For example, UE 115-*b* may be capable of eMBB communications as well as low latency communications such as URLLC.

UE 115-*b* and base station 105-*b* may implement techniques to establish one or more QCL associations between an antenna port used to transmit SRS and an antenna port used to transmit a PUCCH message. For example, the antenna ports may have a Type A QCL association based on one or more time and frequency domain channel parameters, a Type D QCL association based on one or more spatial domain filtering parameters, or both a Type A and Type D QCL association.

At 305, base station 105-*b* may determine a configuration for UE 115-*b*. In some cases, the configuration may be a configuration for PUCCH resources which are allocated to UE 115-*b*. In some cases, base station 105-*b* may determine configurations for QCL associations to associate an SRS transmission with the PUCCH. For example, the configuration may indicate to transmit PUCCH messages on an antenna port that is quasi co-located with at least one antenna port used for the SRS transmission. Thus, the base station 105-*b* may assume that an SRS transmission and a PUCCH transmission are quasi co-located with respect to time and frequency domain channel parameters, such as doppler shift, doppler spread, average delay, delay spread, or any combination thereof. Because of the QCL association, the base station 105-*b* may use the one or more time and frequency domain channel parameters determined for the SRS transmission to improve detection and decoding of the PUCCH transmission.

For example, base station 105-*b* may determine to configure UE 115-*b* with a Type A QCL association, a Type D QCL association, or both a Type A and a Type D QCL associations for a PUCCH resource. In some cases, base station 105-*b* may configure certain QCL associations for only certain service types on the PUCCH resource. For example, Type A QCL association may be configured for low latency PUCCH (e.g., URLLC PUCCH messages), but Type A QCL association may not be configured for eMBB PUCCH messages. In some examples, Type A QCL association may be configured for high reliability (e.g., may satisfy a high reliability requirement for PUCCH transmissions). In some other cases, Type A QCL association may be configured for both low latency and high reliability.

Additionally, or alternatively, some QCL associations may be configured for certain PUCCH formats. For example, QCL association for frequency and time characteristics (e.g., a Type A QCL association) may be applied for PUCCH messages with PUCCH formats 0 and 1, but may not be configured for PUCCH messages with PUCCH formats 2, 3, and 4. Format 0 and 1 may use one or two bits for ACK/NACK feedback and scheduling requests (SRs), and no channel encoding may be used. Formats 2, 3, and 4 may use a greater number of bits and may therefore use channel encoding. In other examples, the QCL association for frequency and time characteristics may be configured for different sets of PUCCH formats or for other PUCCH formats not described.

The QCL associations may also be configured for certain UCI types. In some cases, at least one PUCCH format may be configured to transmit UCI with a given range of payload sizes. In some cases, the UE 115-*b* may apply a QCL association based on the UCI type (e.g., UCI payload size) for the PUCCH transmission. In some examples, whether or not the UE 115-*b* applies a QCL association is based on the UCI payload size of the PUCCH transmission (e.g., apply if payload size falls within the range, don't apply if payload size is outside of the range). In one example, a QCL association for frequency and time characteristics may be configured if the PUCCH message contains ACK, NACK, SR, or any combination thereof, but may not be configured if the PUCCH message is only used for CSI transmission.

In some cases, the configuration message may indicate a condition under which the UE 115-*b* is to apply a QCL association. For example, the condition may be based on a bandwidth size of the PUCCH. The UE 115-*b* may be configured to apply a QCL association if the PUCCH bandwidth is larger than or equal to 'N' resource blocks (e.g., where N is a positive integer), and may skip applying the QCL association if the PUCCH bandwidth is less than 'N' resource blocks. If the condition for the QCL association is not satisfied, the UE 115-*b* may transmit the SRS transmission and the PUCCH transmission via antenna ports that do not satisfy the QCL association. The threshold 'N' may be configurable and may be based on, for example, channel conditions, data throughput rates, channel, latency, or reliability requirements, or other factors. As an example, Type A QCL association between SRS and PUCCH may be generally configured for PUCCH transmissions with a larger bandwidth.

Configuring QCL associations may be a part of the RRC configuration of PUCCH resources, and the QCL associations may tie the PUCCH resources to an SRS resource. In an example, both Type A and Type D QCL associations may be configured for a PUCCH resource. For example, Type A and Type D QCL associations may tie the PUCCH resources to a single SRS resource (e.g., {Type A->SRS-ID-1, Type D->SRS-ID-1}). In another example, the PUCCH resource may be tied to different SRS resources. For example, the Type A QCL association may be tied to a first SRS resource, and the Type D QCL association may be tied to a second, different SRS resource (e.g., {Type A->SRS-ID-1, Type D->SRS-ID-2}). Or, in some cases, only one QCL association may be configured. For example, Type A QCL association may be tied to an SRS resource or Type D QCL association may be tied to the SRS resource, but not both (e.g., {Type A->SRS-ID-1} or {Type D->SRS-ID-1}).

Base station 105-b selects the configuration for the QCL association at 305, and base station 105-b transmits a configuration message including the QCL configuration to UE 115-b at 310. In some cases, the configuration message may be or be included in an RRC message. In some cases, the configuration message may configure UE 115-b with PUCCH resources to transmit PUCCH messages. In some cases, base station 105-b may transmit QCL association updates in an RRC message, and the RRC message may update the configuration for the PUCCH (e.g., for semi-statically configured the UE 115-b). In some cases base station 105-b may operate in a time division duplex (TDD) system, where there may be one or more symbols (e.g., downlink symbols) between the SRS and the PUCCH transmissions (e.g., a PDCCH monitoring occasion, a PDSCH/CSI-RS transmission, etc.). In some cases, the UE 115-b may not apply the antenna port configuration if either there is another uplink (e.g., a PUSCH transmission) or downlink transmission that occurs between the indicated SRS and PUCCH transmission.

UE 115-b may receive the configuration message indicating the QCL association configuration. For example, the configuration message may indicate a QCL association between a PUCCH and an SRS transmission for a time and frequency domain parameter. The QCL association may be, for example, a Type A QCL association as described herein. In some cases, the configuration message may indicate a second QCL association between the SRS and the PUCCH for at least one spatial domain filter parameter, where the control channel transmission and the SRS transmission are each transmitted via antenna ports that satisfy a QCL association based on the spatial domain filter parameters. In some cases, the second QCL association may be an example of a Type D QCL association.

In some cases, UE 115-b may receive the configuration indicating a first service type of a set of different service types to which the QCL association applies. In some cases, the first service type has a latency specification that is lower than a latency specification for a second service type of the set of different service types. In some other cases, the first service type has a reliability specification that is higher than a reliability specification for a second service type. In yet other cases, the first service type has both a latency specification that is lower than a latency specification for the second service type and a reliability specification that is higher than the reliability specification for the second service type of the set of different service types. For example, the first service type may be low latency communications (e.g., URLLC) and the set of service types may also include eMBB communications. In an example, the configuration may indicate that a Type A QCL association is applied for low latency communications, but not for eMBB communications.

In some cases, UE 115-b may receive the configuration message indicating at least one type of UCI of a set of different types of UCI to which the QCL association applies. In some cases, the at least one type of UCI includes an ACK, a NACK, a scheduling request, or any combination thereof. For example, the configuration message may indicate that UE 115-b is to apply a Type A QCL association for PUCCH messages including an ACK, NACK, or scheduling request, but not other types of PUCCH messages.

At 315, UE 115-b may apply the QCL association configuration. At 320, UE 115-b may transmit, in accordance with the QCL association, an SRS transmission via the at least one antenna port to base station 105-b. UE 115-b may transmit the SRS transmission in accordance with QCL associations as configured by the QCL association configuration received at 310. For example, UE 115-b may transmit the SRS transmission on one or more antenna ports by using the same spatial domain filter parameters (e.g., same beam) being quasi co-located with the antenna port used to transmit the PUCCH message at 325. In some examples, the time and frequency domain channel parameter may be a large-scale time and frequency domain parameter (e.g., a measurement of the SRS transmission by the base station 105-b for determining a large-scale property such as doppler shift, doppler spread, delay shift, delay spread, or any combination thereof).

At 325, UE 115-b may transmit, in accordance with the QCL association, a control channel transmission via the PUCCH using an antenna port that is quasi co-located with at least one antenna port for transmitting the SRS transmission. For example, the PUCCH resources may be configured for UE 115-b during RRC connection, and UE 115-b may transmit PUCCH messages based on the QCL association configured during the RRC connection. UE 115-b may transmit the PUCCH message using transmit beam 205-d, which points to base station 105-b. Base station 105-b may receive the PUCCH message using receive beam 205-f, which points to UE 115-b. For example, UE 115-b may have spatial domain filter, time, and frequency domain channel parameters set for transmitting PUCCH messages on the PUCCH.

In some cases, UE 115-b may transmit the PUCCH message on an antenna port in accordance with the QCL association based on whether constraints described above are satisfied. For example, the QCL association may be based on one or more of the PUCCH format, service type, UCI type, or bandwidth of the PUCCH message. In an example, if the PUCCH message meets the constraints included in the configuration message, UE 115-b may transmit the PUCCH message in accordance with the one or more QCL associations included in the configuration message. In some cases, the PUCCH message does not meet the constraints described above, and UE 115-b may not transmit the PUCCH message in accordance with the one or more configured QCL associations. In other examples, there may not be constraints for the PUCCH message indicated in the configuration message, and UE 115-b may transmit the PUCCH message in accordance with the QCL association without checking constraints.

As an example, the QCL configuration may indicate a Type A and Type D QCL association for the SRS antenna port and the PUCCH antenna port. In this example, UE 115-b may transmit the PUCCH message in accordance with the same spatial domain filter parameters (e.g., according to the Type D QCL association) and/or the same time and frequency domain channel (e.g., according to the Type A QCL association) parameters as those used to transmit the SRS transmission on the quasi co-located SRS resource. Thus, in some cases, beam 205-*c* and beam 205-*d* may be in the same direction, for example, if the spatial domain filter parameters are the same.

In another example, the QCL association configuration message may indicate to transmit the SRS transmission in accordance with a Type A QCL association, but not in accordance with a Type D QCL association. Thus, UE 115-*b* may transmit the PUCCH message using one or more antenna ports as the antenna port used to transmit SRS transmissions on the quasi co-located SRS resource, and hence the SRS transmission and the PUCCH transmission may have the same large-scale time and frequency properties (e.g., the same doppler shift, doppler spread, average delay, or average spread, or any combination thereof). However, in this example, the PUCCH message may be transmitted using an antenna port with a different spatial filter as that used to transmit the SRS transmissions. For example, beam 205-*c* and beam 205-*d* may not be in the same direction.

The QCL association may improve the PUCCH detection performance and channel estimation performance at base station 105-*b*. In some cases, the QCL association may allow base station 105-*b* to infer the power delay profile (PDP) of the PUCCH channel from the SRS channel, which may improve the channel estimation performance for the PUCCH. Base station 105-*b* may determine the PDP for the physical layer uplink control channel from the SRS transmission and determine a channel estimate for the physical uplink control channel based on the PDP. Base station 105-*c* may demodulate the control channel transmission based on the channel estimate.

In some cases, base station 105-*b* may transmit an update message to UE 115-*b*. The update message may be a configuration update via control signaling, or a grant scheduling resources for uplink communications. The update message may include another, or a next, QCL association configuration, which may be different from the QCL association configuration transmitted at 310. The next QCL association configuration may implement feedback based on the SRS transmitted at 320 or a decoding of a physical downlink control channel (PDCCH) message. In some cases, the next QCL association configuration may replace the QCL association configuration transmitted at 310. For example, base station 105-*b* may update the QCL association configuration based on varying channel conditions or channel requirements.

Figure 4:
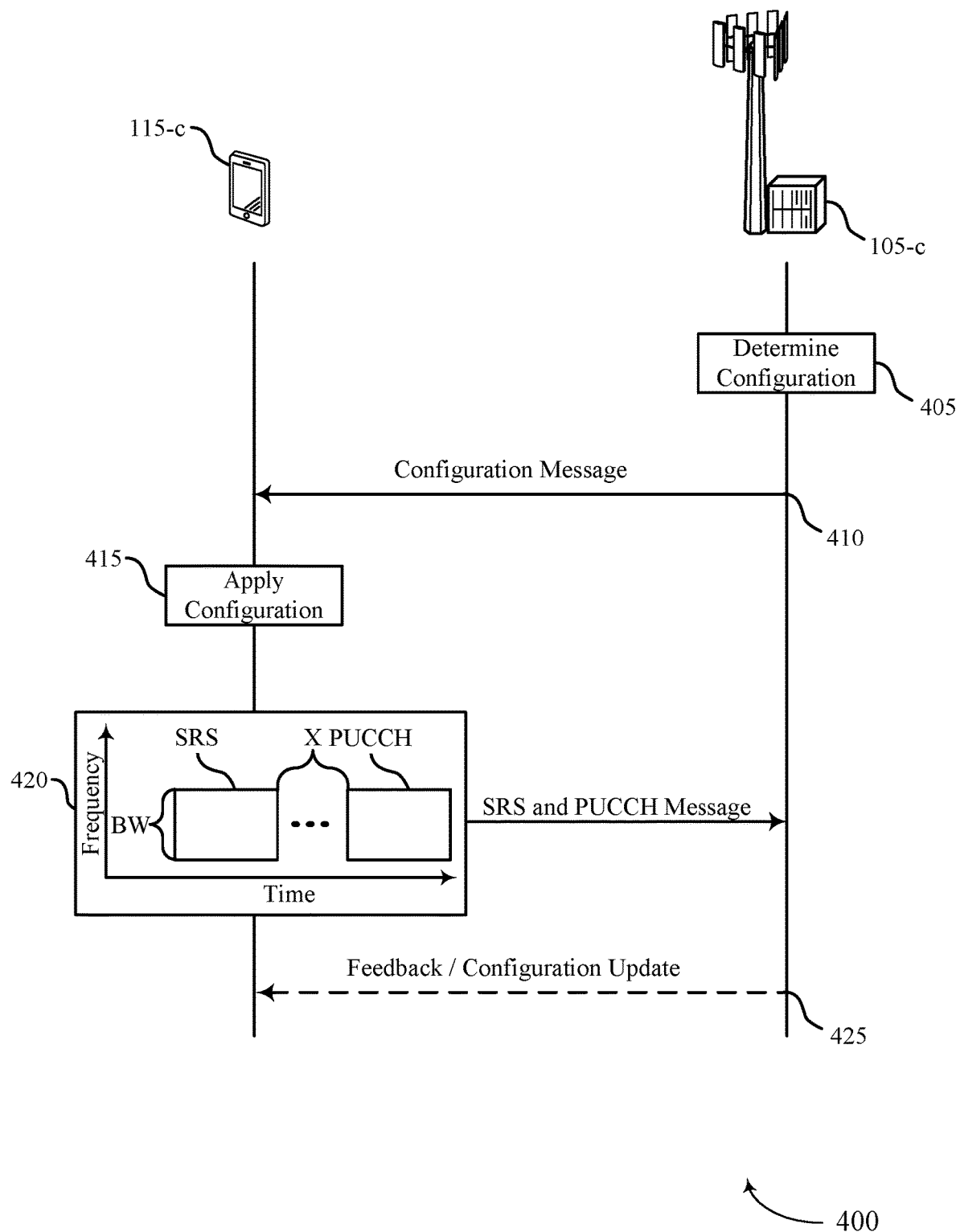
FIG. 4 illustrates an example of a process flow that supports reference signal and uplink control channel association design in accordance with aspects of the present disclosure.

FIG. 4 illustrates an example of a process flow 400 that supports reference signal and uplink control channel association design in accordance with aspects of the present disclosure. In some examples, process flow 400 may implement aspects of wireless communications system 100.

Process flow 400 includes UE 115-*c* and base station 105-*c*, which may be respective examples of a UE 115 and a base station 105 as described herein. As described in FIG. 2, UE 115-*c* and base station 105-*c* may communicate using beamforming techniques. For example, UE 115-*c* may directionally transmit to base station 105-*c* using a beam 205 pointed toward base station 105-*c*, and base station 105-*c* may receive the transmissions using a receive beam 205 pointed toward UE 115-*c*. In some cases, UE 115-*c* may be capable of communications using multiple different services types. For example, UE 115-*c* may be capable of eMBB communications as well as low latency communications such as URLLC.

UE 115-*c* and base station 105-*c* may implement techniques to establish antenna port associations for SRS transmissions and PUCCH transmissions. For example, UE 115-*c* may transmit SRS transmissions and PUCCH messages from the same antenna port. Base station 105-*c* may infer the instantaneous channel used to transmit the PUCCH message from the channel of the SRS. In some cases, downlink control information may trigger transmissions of both the SRS and the PUCCH. In some cases, the same downlink control information message may trigger both the SRS and the PUCCH transmissions, and an antenna port association for the SRS and the PUCCH may be based on the triggering occurring in the same downlink control information. In some cases, a configuration message sent by base station 105-*c* may configure an antenna port association between a PUCCH resource and a SRS resource, and UE 115-*c* may apply the antenna port association when the PUCCH transmission and SRS transmission are triggered by the same DCI. In some examples, the configuration message may configure an antenna port association between a PUCCH resource and an SRS resource, and UE 115-*c* may apply the antenna port association when a PUCCH transmission and SRS transmission are triggered by the same DCI, and may not apply that antenna port association at other times (e.g., when a PUCCH transmission and SRS transmission are triggered by different DCI).

At 405, base station 105-*c* may determine a configuration for UE 115-*c*. To apply the antenna port association, UE 115-*c* may need to maintain phase coherence between the SRS transmission and the PUCCH transmission. To maintain phase coherence, the configuration may include aspects associated with a gap in the time domain between the transmissions, the transmit power of the transmissions, and the bandwidths of the transmissions.

For example, UE 115-*c* may meet the phase coherence requirement when the gap in the time domain between the SRS transmission and the PUCCH message is less than a threshold number of symbols (e.g., 'X' symbols). The threshold 'X' may be configurable and may be based on a numerology for the subcarrier spacing (SCS). Numerology may refer to a relationship between a number of symbols and sub-carrier spacing used for a transmission. For example, 'X' may be 1 symbol for 15 kHz SCS, 2 for 30 kHz SCS, and 4 for 60 kHz SCS. In some other examples, 'X' may be 0, where the PUCCH message is directly adjacent to the SRS transmission. Base station 105-*c* may determine which 'X' to include in the configuration message for the antenna association. The value of 'X' may also be indicated from UE 115-*c* to base station 105-*c* as part of indicating UE capability.

UE 115-*c* may also be configured to align the transmission power of the SRS transmissions and the PUCCH messages to maintain phase coherence. In some cases, the SRS transmission power may follow the PUCCH transmission power. Base station 105-*c* may determine the configuration for the transmission power and include the configuration for the SRS and PUCCH transmission power in the configuration message for the antenna association.

UE 115-*c* may also be configured to adjust the SRS bandwidth to align with the PUCCH bandwidth. In some cases, the SRS transmission may have the same bandwidth and use the same RBs as the PUCCH message. Base station 105-*c* may determine the SRS bandwidth configuration and include the SRS bandwidth in the configuration message for the antenna association.

At 410, base station 105-*c* may transmit the configuration message indicating the antenna port association between an SRS transmission and a PUCCH. The configuration message may include the antenna association configurations determined at 405. In some cases, the antenna port association may be implicitly or explicitly indicated to UE 115-*c* based on various factors. For example, the antenna port association may be implicitly indicated to UE 115-*c* in cases where the SRS transmission and the PUCCH transmission are triggered in the same downlink control information. At 415, UE 115-*c* may apply the configuration. In some cases base station 105-*c* may operate in a time division duplex (TDD) system, where there may be downlink symbols between the SRS and the PUCCH transmissions (e.g., a PDCCH monitoring occasion, a PDSCH/CSI-RS transmission, etc.). In some cases, the UE 115-*c* may not apply the antenna port configuration if either there is another uplink (e.g., a PUSCH transmission) or a downlink transmission between the indicated SRS and PUCCH transmission.

At 420, UE 115-*c* may transmit, in accordance with the antenna port association, the SRS transmission via an SRS resource and a control channel transmission via the PUCCH. For example, the antenna port association may indicate for UE 115-*c* to transmit the SRS transmission and the control channel transmission via a same antenna port, and UE 115-*c* may transmit the SRS transmission and the control channel transmission via the same antenna port. In some cases, an antenna port association may be conveyed at an SRS-PUCCH resource level. Thus, if UE 115-*a* is configured or indicated to transmit a PUCCH on a particular resource that has an antenna port association with an SRS resource, then UE 115-*a* may transmit the SRS and the PUCCH according to the antenna port association between the two resources. For example, the configuration message may indicate an antenna port association between an SRS resource and a PUCCH resource, and the UE 115-*c* may transmit the SRS on the SRS resource and the PUCCH on the PUCCH resource in accordance with the antenna port association.

In some cases, each of the SRS transmission and the control channel transmission are transmitted via the same antenna port within a defined amount of time. In some cases, the defined amount of time is based on a numerology. The defined amount of time may be, for example, related to the 'X' symbols described above. The antenna port association may indicate to transmit the SRS transmission and the PUCCH message with a gap of 'X' or less symbols between the transmissions. In some cases, UE 115-*c* may not apply the antenna port association if there is another uplink transmission (e.g., a PUSCH transmission), or a downlink transmission between the indicated SRS and PUCCH transmissions.

In some cases, UE 115-*c* may transmit the SRS transmission using a first transmission power and the control channel transmission using a second transmission power, where a difference between the first transmission power and the second transmission power satisfies (e.g., is smaller than) a threshold. For example, UE 115-*c* may transmit the SRS transmission using a transmission power that follows the PUCCH transmission power, which may be indicated by the antenna port association and included in the configuration message.

In some cases, UE 115-*c* may adjust the first transmission power to make the difference between the first transmission power and the second transmission power satisfy the threshold (e.g., the power difference is smaller than the threshold). In some cases, the control channel transmission may be a scheduling request transmission indicating that UE 115-*c* has uplink data available for transmission, and the adjusting the first transmission power may be based on the scheduling request transmission indicating that UE 115-*c* has uplink data available for transmission. In some cases, the first transmission power and the second transmission power may be the same.

In some cases, UE 115-*c* may transmit the SRS transmission using a first bandwidth and the control channel transmission (e.g., transmission of a PUCCH message via PUCCH) using a second bandwidth, where a difference between the first bandwidth and the second bandwidth satisfies a threshold (e.g., the bandwidth difference is smaller than the threshold). The bandwidth threshold may be included in the configuration message and may be a part of the antenna port association. In some cases, UE 115-*c* may adjust the first bandwidth to make the difference between the first bandwidth and the second bandwidth satisfy the threshold. In some cases, the first bandwidth and the second bandwidth may be the same (e.g., SRS transmission may have the same bandwidth and use the same RB(s) as the PUCCH transmission). In some cases, UE 115-*c* may adjust the first bandwidth, which is used for the SRS transmission, to align with the bandwidth used for the PUCCH message. The bandwidth threshold may be indicated by the antenna port association and included in the configuration message transmitted at 410. In some cases, base station 105-*c* may receive each of the SRS transmission and the control channel transmission within a defined amount of time. In some cases, the defined amount of time may be based on a numerology.

In some cases, base station 105-*c* may determine a first channel estimate for the SRS transmission and determine a second channel estimate for the PUCCH message based on the first channel estimate. Base station 105-*c* may then demodulate the PUCCH message (e.g., control channel transmission) based on the second channel estimate. For example, because the SRS transmission and the PUCCH message are sent via a same antenna port, the first channel estimate for the SRS transmission may have a defined relationship with the second channel estimate for the PUCCH message. The base station 105-*c* may calculate the second channel estimate as a function of the defined relationship and the first channel estimate for the SRS transmission, and may use the second channel estimate for demodulating the PUCCH message.

In some cases, UE 115-*c* may receive downlink control information to trigger transmission of the SRS transmission and the control channel transmission. In some cases, the downlink control information may trigger both the transmission of the SRS transmission and the control channel transmission (e.g., triggering for an SRS transmission may occur in the same downlink control information message as triggering for the control channel transmission). In other cases, the downlink control information may trigger either the SRS transmission or the control channel transmission. For example, base station 105-*c* may use downlink control information to jointly trigger back-to-back aperiodic SRS and PUCCH messages (e.g., an ACK or NACK) via a same antenna port. The SRS may serve as an additional demodulation reference signal (DMRS) for PUCCH. For example, the SRS serving as an additional DMRS may provide channel condition information at locations other than at the end of a slot, which may provide additional channel quality information for different times of the uplink transmission. Base station 105-*c* may use the additional channel quality information to estimate the channel and decode the PUCCH message. In some cases, the downlink control information may indicate whether to transmit the SRS transmission before or after the PUCCH message.

Base station 105-*c* may receive the PUCCH message and the SRS transmission and infer the channel of the physical uplink control channel from the channel of the SRS to improve detecting and decoding the PUCCH.

In some cases, base station 105-*c* may, at 425, transmit an update message to UE 115-*c*. The update message may be a configuration update via control signaling or a grant scheduling resources for uplink communications. The update message may include another, or a next, antenna port association configuration, which may be different from the antenna port association configuration transmitted at 410. The next antenna port association configuration may implement feedback based on the SRS transmitted at 320 or a decoding of the PDCCH message. In some cases, the next antenna port association configuration may replace the antenna port association configuration transmitted at 310. For example, base station 105-*c* may update the antenna port association configuration based on varying channel conditions or channel requirements or based on the channel estimate made based on the SRS transmission.

Figure 5:
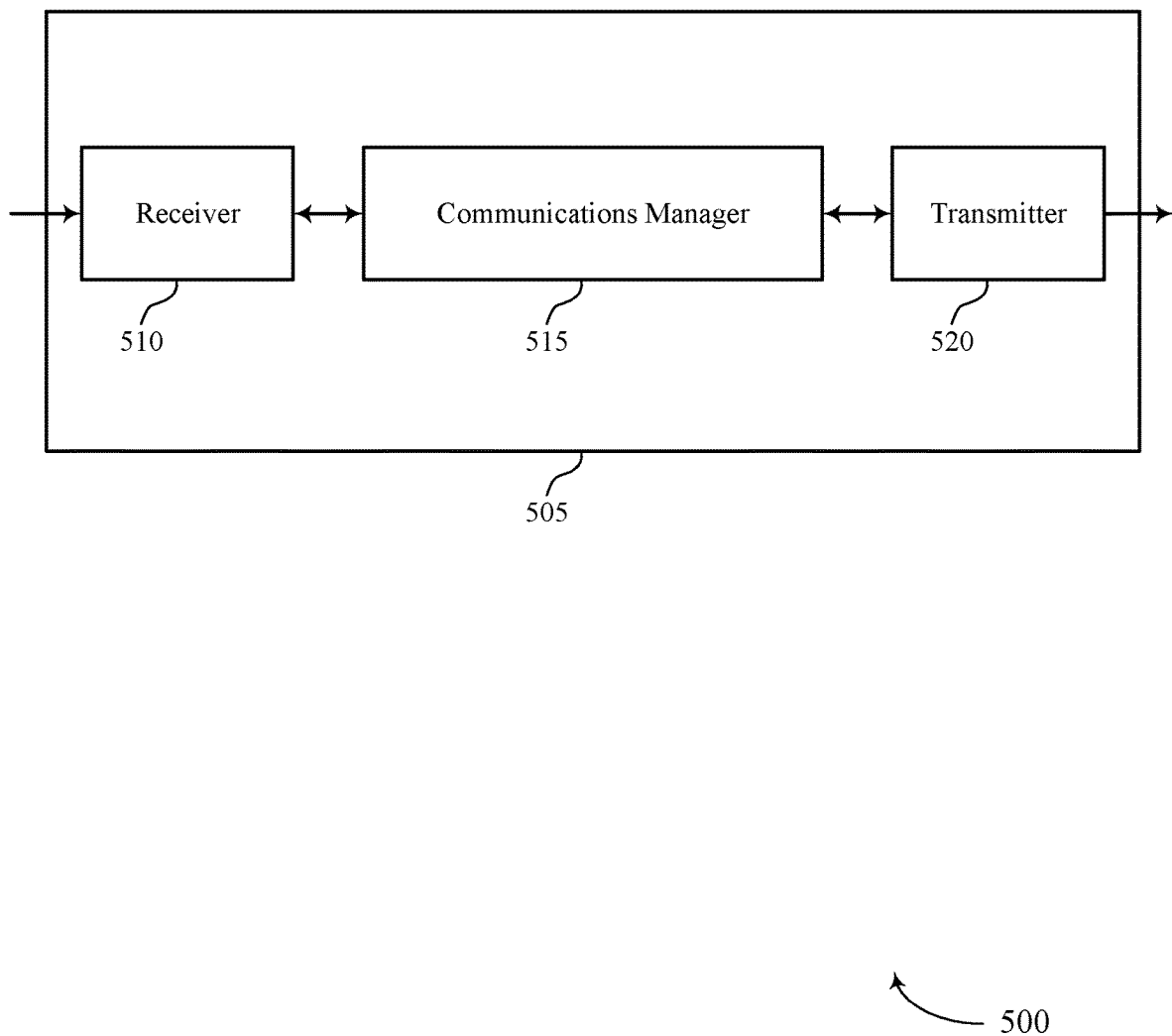
FIGS. 5 and 6 show block diagrams of devices that support reference signal and uplink control channel association design in accordance with aspects of the present disclosure.

FIG. 5 shows a block diagram 500 of a device 505 that supports reference signal and uplink control channel association design in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to reference signal and uplink control channel association design, etc.). Information may be passed on to other components of the device 505. The receiver 510 may be an example of aspects of the transceiver 820 described with reference to FIG. 8. The receiver 510 may utilize a single antenna or a set of antennas.

In some cases, the communications manager 515 may receive a configuration message indicating a QCL association between a physical uplink control channel and an SRS transmission for at least one time and frequency domain channel parameter, transmit, in accordance with the QCL association, a control channel transmission via the physical uplink control channel using an antenna port that is quasi co-located with at least one antenna port for transmitting the SRS transmission, and transmit, in accordance with the QCL association, the SRS transmission via the at least one antenna port.

In some cases, the communications manager 515 may also receive a configuration message indicating an antenna port association between an SRS transmission and a physical uplink control channel and transmit, in accordance with the antenna port association, the SRS transmission via an SRS resource and a control channel transmission via the physical uplink control channel. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, communications manager 515 may be implemented as an integrated circuit or chipset for a mobile device modem, and the receiver 510 and transmitter 520 may be implemented as analog components (e.g., amplifiers, filters, antennas, etc.) coupled with the mobile device modem to enable wireless transmission and reception.

The communications manager 515 as described herein may be implemented to realize one or more potential advantages. For example, in some cases, the implementation of quasi co-located signals may allow a receiving device (e.g., a UE or a base station) to assume that certain received signals or channels are quasi co-located with respect to time and frequency (e.g., doppler shift, doppler spread, average delay, delay spread, and so on). Knowledge of such QCL associations may improve channel decoding by the receiver, which may increase overall channel decoding and estimation performance. Such improvements in performance may additionally improve communication throughput between devices in the network.

Based on implementing the reference signal and uplink control channel association design as described herein, one or more processors of the device 505 (e.g., processor(s) controlling or incorporated with one or more of receiver 510, communications manager 515, and transmitter 520) may successfully decode uplink control information and reduce latency and the number of retransmissions that may occur between devices in order to successfully communicate with one another.

Figure 6:
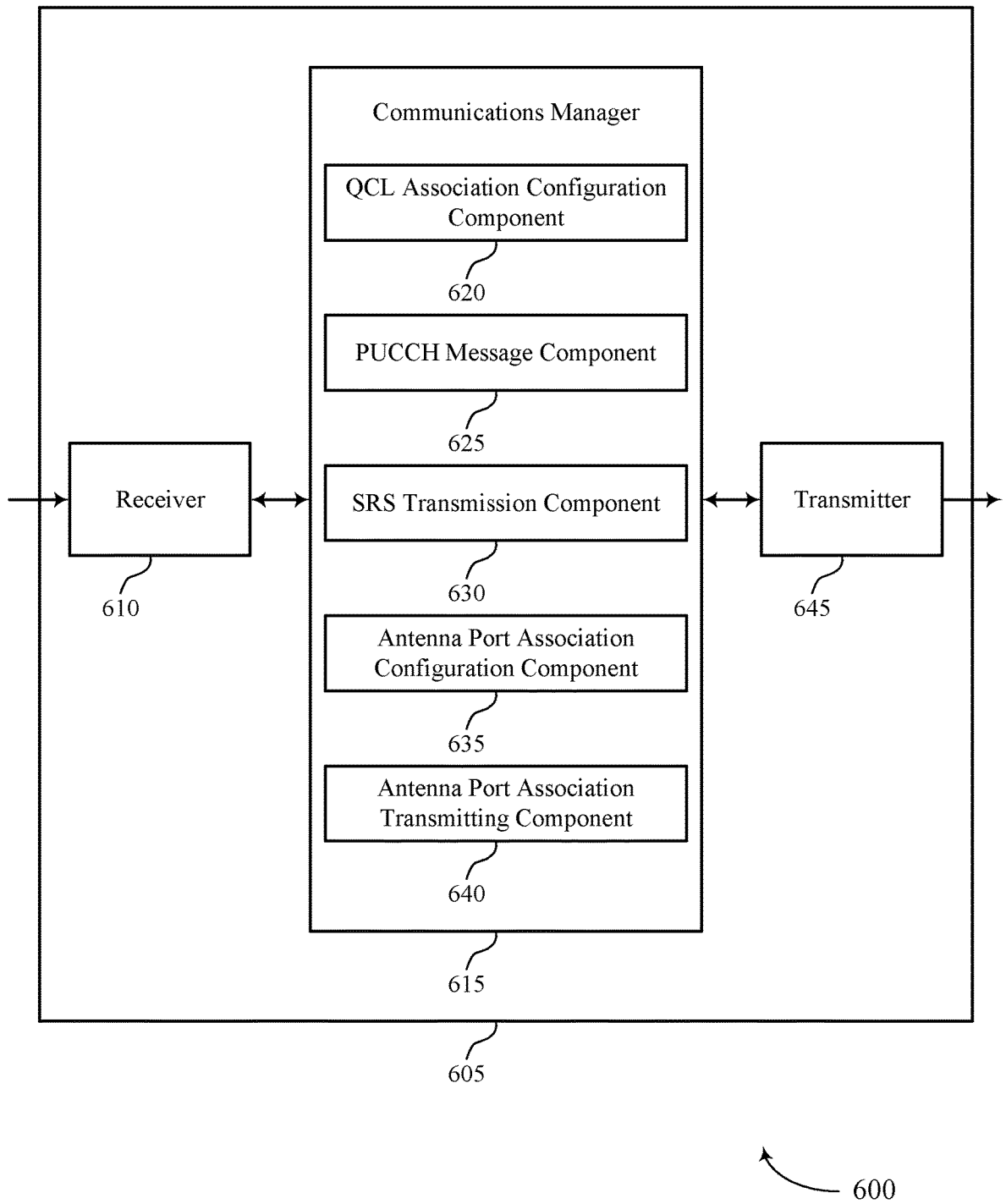

FIG. 6 shows a block diagram 600 of a device 605 that supports reference signal and uplink control channel association design in accordance with aspects of the present disclosure. The device 605 may be an example of aspects of a device 505 or a UE 115 as described herein. The device 605 may include a receiver 610, a communications manager 615, and a transmitter 645. The device 605 may also include a processor. Each of these components may be in communication with one another (e.g., via one or more buses).

The receiver 610 may receive information such as packets, user data, or control information associated with various information channels (e.g., control channels, data channels, and information related to reference signal and uplink control channel association design, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a QCL association configuration component 620, a PUCCH message component 625, an SRS transmission component 630, an antenna port association configuration component 635, and an antenna port association transmitting component 640. The communications manager 615 may be an example of aspects of the communications manager 810 described herein.

The QCL association configuration component 620 may receive a configuration message indicating a QCL association between a physical uplink control channel and an SRS transmission for at least one time and frequency domain channel parameter. The PUCCH message component 625 may transmit, in accordance with the QCL association, a control channel transmission via the physical uplink control channel using an antenna port that is quasi co-located with at least one antenna port for transmitting the SRS transmission. The SRS transmission component 630 may transmit, in accordance with the QCL association, the SRS transmission via the at least one antenna port.

The antenna port association configuration component 635 may receive a configuration message indicating an antenna port association between an SRS transmission and a physical uplink control channel. The antenna port association transmitting component 640 may transmit, in accordance with the antenna port association, the SRS transmission via an SRS resource and a control channel transmission via the physical uplink control channel. In some cases, the antenna port association configuration component 635 may identify that an uplink transmission or a downlink transmission occurs between a second SRS transmission and a second control channel transmission, determine not to apply the antenna port association based at least in part on the identifying, and transmit the second SRS transmission and the second control channel transmission based at least in part on the determining The transmitter 645 may transmit signals generated by other components of the device 605. In some examples, the transmitter 645 may be collocated with a receiver 610 in a transceiver module. For example, the transmitter 645 may be an example of aspects of the transceiver 820 described with reference to FIG. 8. The transmitter 645 may utilize a single antenna or a set of antennas.

Figure 7:
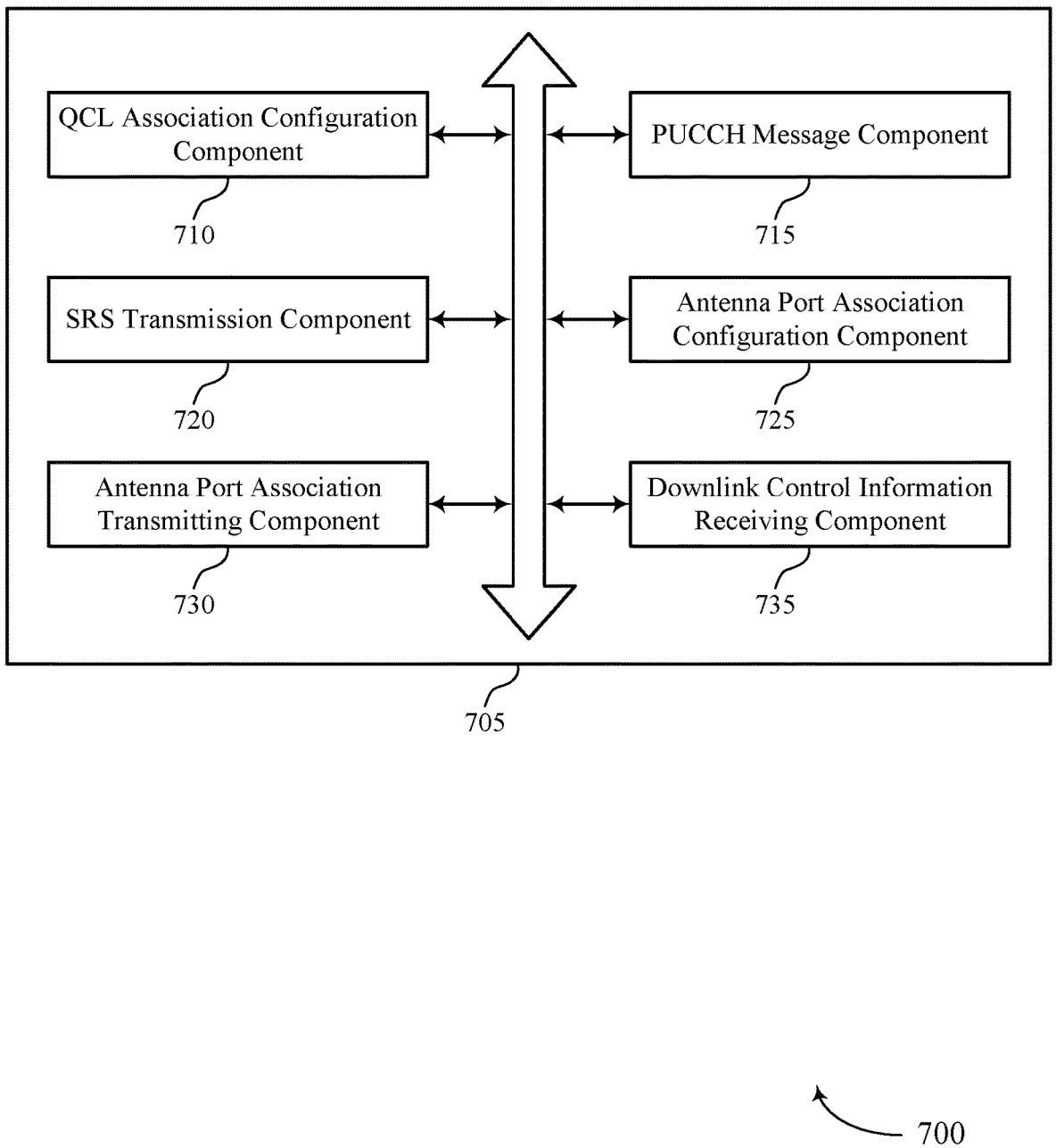
FIG. 7 shows a block diagram of a communications manager that supports reference signal and uplink control channel association design in accordance with aspects of the present disclosure.

FIG. 7 shows a block diagram 700 of a communications manager 705 that supports reference signal and uplink control channel association design in accordance with aspects of the present disclosure. The communications manager 705 may be an example of aspects of a communications manager 515, a communications manager 615, or a communications manager 810 described herein. The communications manager 705 may include a QCL association configuration component 710, a PUCCH message component 715, an SRS transmission component 720, an antenna port association configuration component 725, an antenna port association transmitting component 730, and a downlink control information receiving component 735. Each of these modules may communicate, directly or indirectly, with one another (e.g., via one or more buses).

The QCL association configuration component 710 may receive a configuration message indicating a QCL association between a physical uplink control channel and an SRS transmission for at least one time and frequency domain channel parameter. In some cases, the time and frequency domain channel parameter includes at least one of a doppler shift, a doppler spread, an average delay, a delay spread, or any combination thereof. In some cases, the time and frequency domain channel parameter is a large-scale time and frequency domain channel parameter.

In some examples, the QCL association configuration component 710 may receive the configuration message indicating a second QCL association between the SRS transmission and the physical uplink control channel for at least one spatial domain filter parameter, where the control channel transmission and the SRS transmission are each transmitted in accordance with the at least one spatial domain filter parameter.

In some examples, the QCL association configuration component 710 may receive the configuration message indicating a second QCL association between a second SRS transmission and the physical uplink control channel for at least one spatial domain filter parameter, the second SRS transmission differing from the SRS transmission, where the control channel transmission and the second SRS transmission are each transmitted in accordance with the at least one spatial domain filter parameter.

In some examples, the QCL association configuration component 710 may receive the configuration message indicating a first service type of a set of different service types to which the QCL association applies. In some cases, the first service type has a latency specification that is lower than a latency specification for a second service type of the set of different service types. In some other cases, the first service type has a reliability specification that is higher than a reliability specification for a second service type. In yet other cases, the first service type has both a latency specification that is lower than a latency specification for the second service type and a reliability specification that is higher than the reliability specification for the second service type of the set of different service types.

In some examples, the QCL association configuration component 710 may receive the configuration message indicating at least one type of physical uplink control channel format of a set of different types of physical uplink control channel formats to which the QCL association applies. In some cases, the configuration message is received via radio resource control signaling. In some cases, the at least one type of physical uplink control channel format is configured for a first service type having a latency specification that is lower than a latency specification and a reliability specification that is higher than a reliability specification for a second service type, and is not configured for the second service type. In some cases, the at least one type of physical uplink control channel format is configured to include an acknowledgement, a negative acknowledgement, a scheduling request, or any combination thereof. In some cases, the at least one type of physical uplink control channel format is configured to transmit uplink control information with a range of payload sizes In some examples, the QCL association configuration component 710 may receive the configuration message indicating at least one type of uplink control information of a set of different types of uplink control information to which the QCL association applies. In some cases, the at least one type of uplink control information is configured to include an acknowledgement, a negative acknowledgement, a scheduling request, or any combination thereof.

In some examples, the QCL association configuration component 710 may receive the configuration message indicating to apply the QCL association when the physical uplink control channel has at least a defined number of resource blocks.

In some examples, the QCL association configuration component 710 may receive the configuration message indicating at least one physical uplink control channel resource of a set of different physical uplink control channel resources to which the QCL association applies.

The PUCCH message component 715 may transmit, in accordance with the QCL association, a control channel transmission via the physical uplink control channel using an antenna port that is quasi co-located with at least one antenna port for transmitting the SRS transmission.

The SRS transmission component 720 may transmit, in accordance with the QCL association, the SRS transmission via the at least one antenna port.

The antenna port association configuration component 725 may receive a configuration message indicating an antenna port association between an SRS transmission and a physical uplink control channel. In some examples, the antenna port association configuration component 725 may receive the configuration message to configure the UE to maintain phase coherence between the SRS transmission and the control channel transmission.

The antenna port association transmitting component 730 may transmit, in accordance with the antenna port association, the SRS transmission via an SRS resource and a control channel transmission via the physical uplink control channel. In some examples, the antenna port association transmitting component 730 may transmit the SRS transmission and the control channel transmission via the same antenna port.

In some examples, the antenna port association transmitting component 730 may transmit the SRS transmission using a first transmission power and the control channel transmission using a second transmission power, where a difference between the first transmission power and the second transmission power satisfies a threshold.

In some examples, the antenna port association transmitting component 730 may adjust the first transmission power to make the difference between the first transmission power and the second transmission power satisfy the threshold.

In some examples, the antenna port association transmitting component 730 may transmit the SRS transmission using a first bandwidth and the control channel transmission using a second bandwidth, where a difference between the first bandwidth and the second bandwidth satisfies a threshold. In some examples, the antenna port association transmitting component 730 may adjust the first bandwidth to make the difference between the first bandwidth and the second bandwidth satisfy the threshold.

In some cases, each of the SRS transmission and the control channel transmission are transmitted via the same antenna port within a defined amount of time. In some cases, the defined amount of time is based on a numerology.

In some cases, the control channel transmission is a scheduling request transmission indicating that the UE has uplink data available for transmission, and the adjusting the first transmission power is based on the scheduling request transmission indicating that the UE has uplink data available for transmission. In some cases, the control channel transmission is a scheduling request transmission indicating that the UE has uplink data available for transmission, and the adjusting the first bandwidth is based on the scheduling request transmission indicating that the UE has uplink data available for transmission.

The downlink control information receiving component 735 may receive downlink control information to trigger transmission of the SRS transmission and the control channel transmission. In some cases, the downlink control information indicates an order in which to transmit the SRS transmission relative to the control channel transmission. In some cases, the SRS transmission is an aperiodic SRS transmission. In some cases, the configuration message is received via radio resource control signaling.

Figure 8:
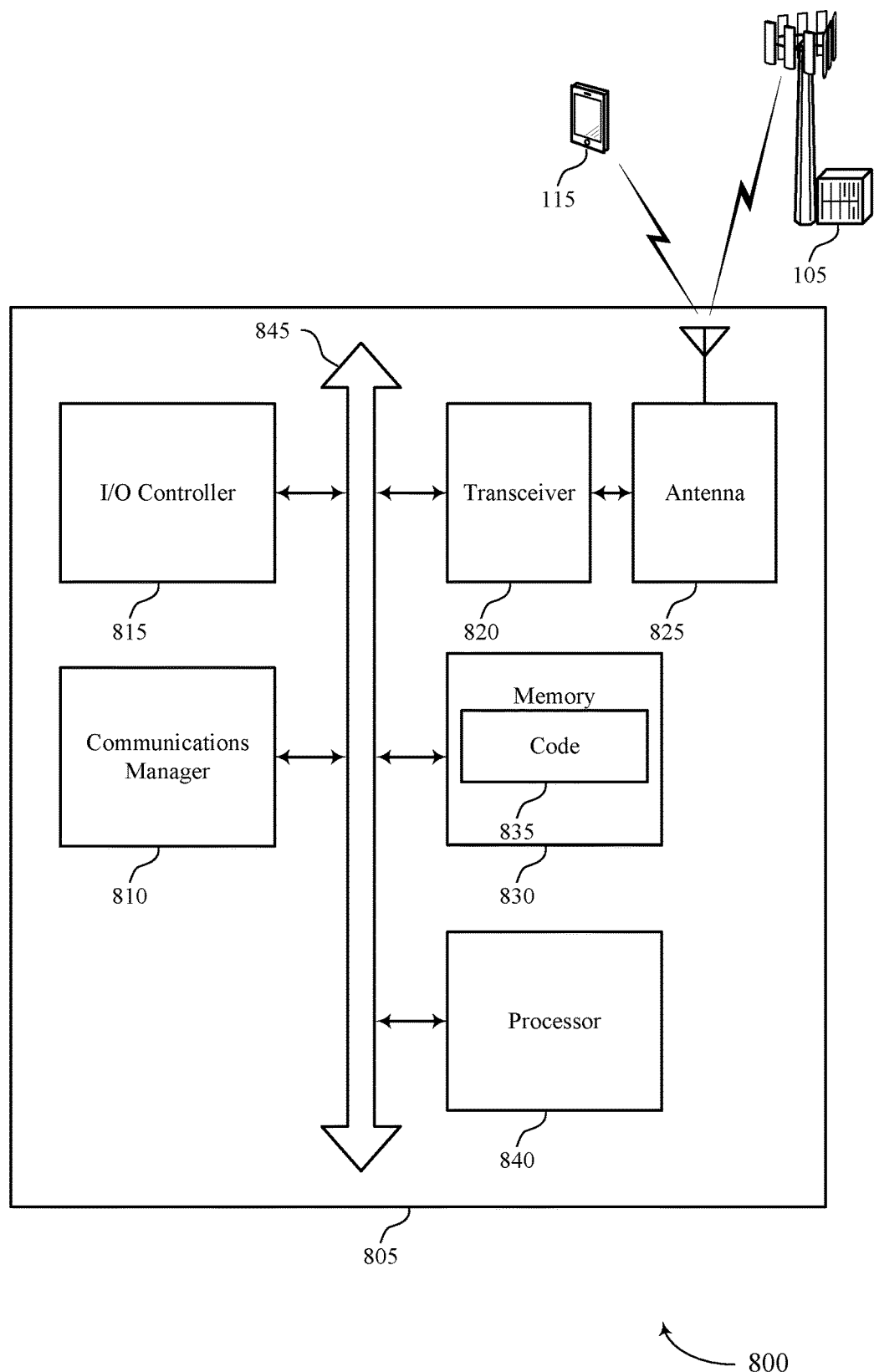
FIG. 8 shows a diagram of a system including a device that supports reference signal and uplink control channel association design in accordance with aspects of the present disclosure.

FIG. 8 shows a diagram of a system 800 including a device 805 that supports reference signal and uplink control channel association design in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a configuration message indicating a QCL association between a physical uplink control channel and an SRS transmission for at least one time and frequency domain channel parameter, transmit, in accordance with the QCL association, a control channel transmission via the physical uplink control channel using an antenna port that is quasi co-located with at least one antenna port for transmitting the SRS transmission, and transmit, in accordance with the QCL association, the SRS transmission via the at least one antenna port. The communications manager 810 may also receive a configuration message indicating an antenna port association between an SRS transmission and a physical uplink control channel and transmit, in accordance with the antenna port association, the SRS transmission via an SRS resource and a control channel transmission via the physical uplink control channel.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting reference signal and uplink control channel association design).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
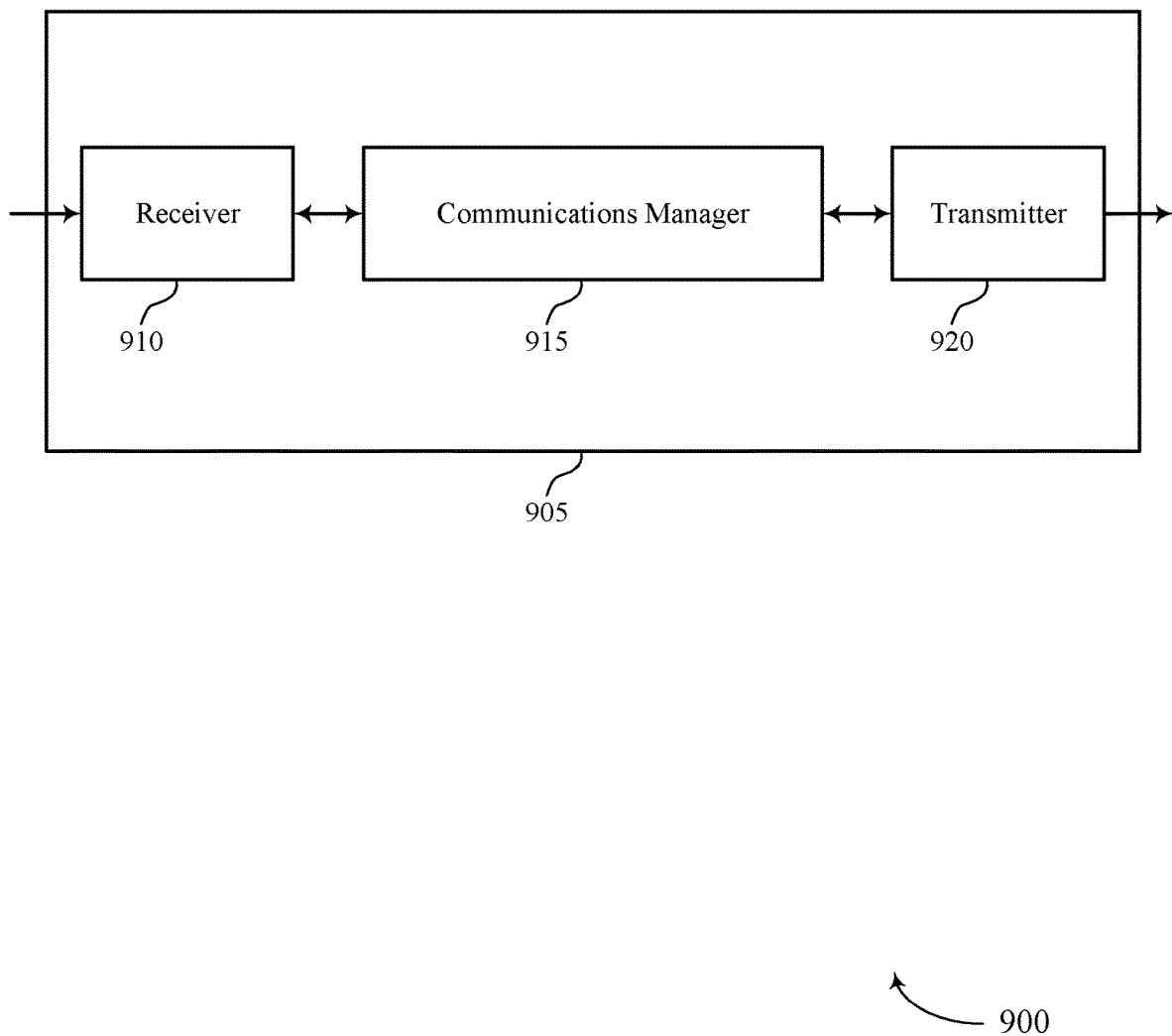
FIGS. 9 and 10 show block diagrams of devices that support reference signal and uplink control channel association design in accordance with aspects of the present disclosure.

FIG. 9 shows a block diagram 900 of a device 905 that supports reference signal and uplink control channel association design in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to reference signal and uplink control channel association design, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit a configuration message indicating a QCL association between a physical uplink control channel and an SRS transmission for at least one time and frequency domain channel parameter and receive, in accordance with the QCL association, the SRS transmission via an SRS resource and a control channel transmission via the physical uplink control channel. The communications manager 915 may also transmit a configuration message indicating an antenna port association between an SRS transmission and a physical uplink control channel and receive, in accordance with the antenna port association, the SRS transmission via an SRS resource and a control channel transmission via the physical uplink control channel. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
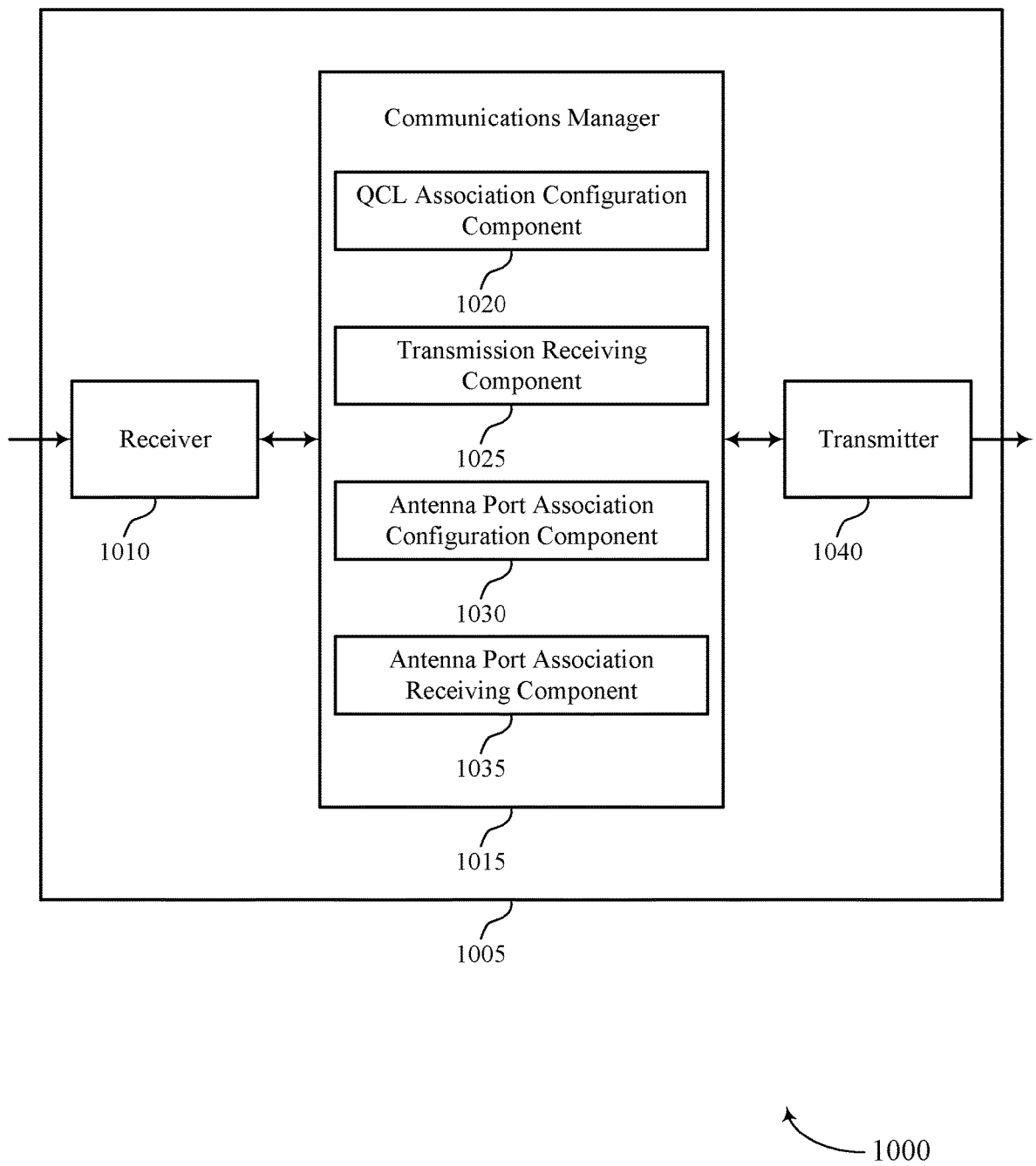

FIG. 10 shows a block diagram 1000 of a device 1005 that supports reference signal and uplink control channel association design in accordance with aspects of the present disclosure. The device 1005 may be an example of aspects of a device 905 or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to reference signal and uplink control channel association design, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a QCL association configuration component 1020, a transmission receiving component 1025, an antenna port association configuration component 1030, and an antenna port association receiving component 1035. The communications manager 1015 may be an example of aspects of the communications manager 1210 described herein.

The QCL association configuration component 1020 may transmit a configuration message indicating a QCL association between a physical uplink control channel and an SRS transmission for at least one time and frequency domain channel parameter. The transmission receiving component 1025 may receive, in accordance with the QCL association, the SRS transmission via an SRS resource and a control channel transmission via the physical uplink control channel.

The antenna port association configuration component 1030 may transmit a configuration message indicating an antenna port association between an SRS transmission and a physical uplink control channel. The antenna port association receiving component 1035 may receive, in accordance with the antenna port association, the SRS transmission via an SRS resource and a control channel transmission via the physical uplink control channel.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
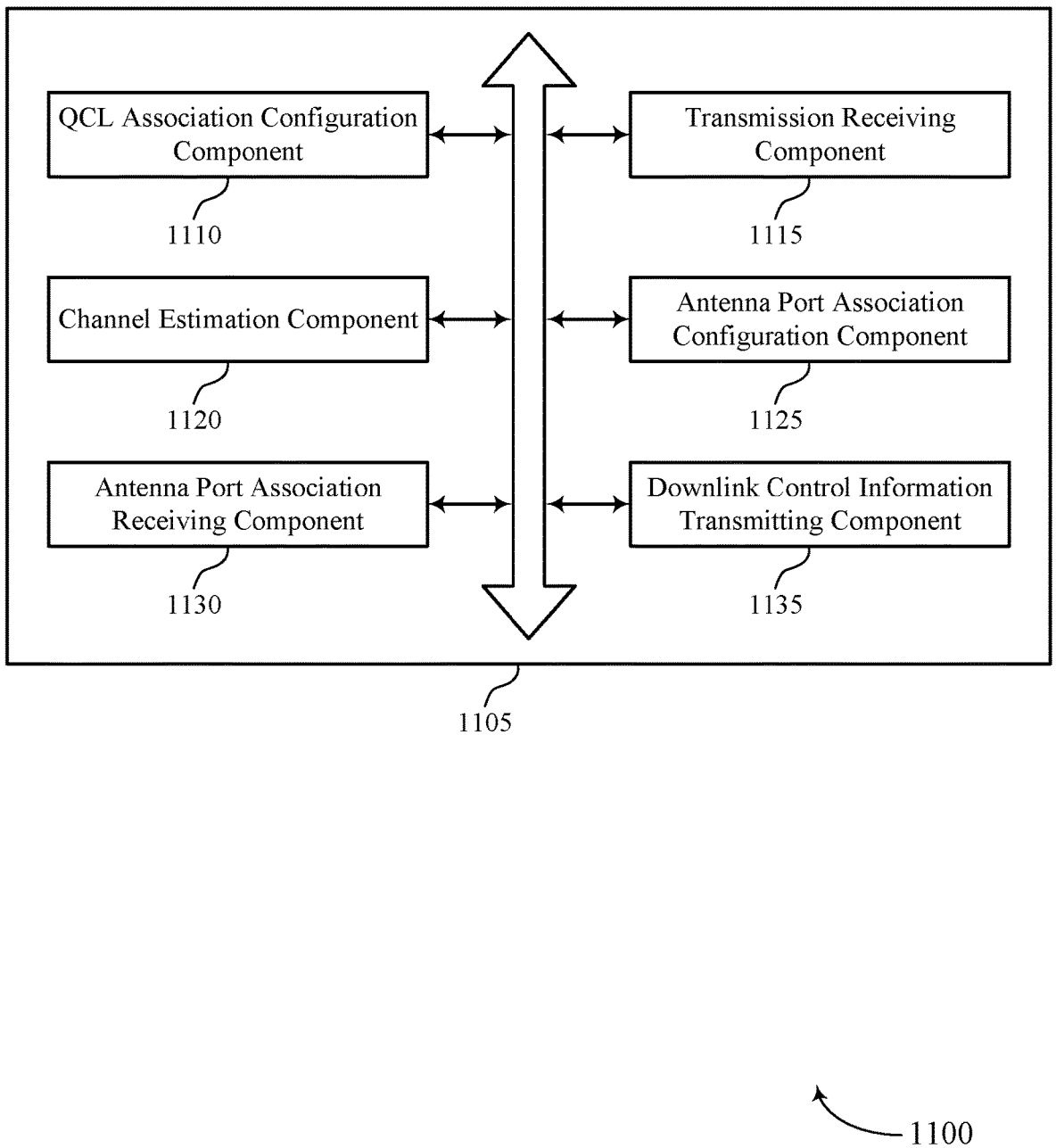
FIG. 11 shows a block diagram of a communications manager that supports reference signal and uplink control channel association design in accordance with aspects of the present disclosure.

FIG. 11 shows a block diagram 1100 of a communications manager 1105 that supports reference signal and uplink control channel association design in accordance with aspects of the present disclosure. The communications manager 1105 may be an example of aspects of a communications manager 915, a communications manager 1015, or a communications manager 1210 described herein. The communications manager 1105 may include a QCL association configuration component 1110, a transmission receiving component 1115, a channel estimation component 1120, an antenna port association configuration component 1125, an antenna port association receiving component 1130, and a downlink control information transmitting component 1135. Each of these modules may communicate, directly or indirectly, with one another (e.g., via one or more buses).

The QCL association configuration component 1110 may transmit a configuration message indicating a QCL association between a physical uplink control channel and an SRS transmission for at least one time and frequency domain channel parameter. In some cases, the time and frequency domain channel parameter includes at least one of a doppler shift, a doppler spread, an average delay, a delay spread, or any combination thereof. In some cases, the configuration message is transmitted via radio resource control signaling. In some cases, the time and frequency domain channel parameter is a large-scale time and frequency domain channel parameter.

In some examples, the QCL association configuration component 1110 may transmit the configuration message indicating a second QCL association between the SRS transmission and the physical uplink control channel for at least one spatial domain filter parameter. In some examples, the QCL association configuration component 1110 may transmit the configuration message indicating a second QCL association between a second SRS transmission and the physical uplink control channel for at least one spatial domain filter parameter, the second SRS transmission differing from the SRS transmission.

In some examples, the QCL association configuration component 1110 may transmit the configuration message indicating a first service type of a set of different service types to which the QCL association applies. In some cases, the first service type has a latency specification that is lower than a latency specification and a reliability specification that is higher than a reliability specification for a second service type of the set of different service types.

In some examples, the QCL association configuration component 1110 may transmit the configuration message indicating at least one type of physical uplink control channel format of a set of different types of physical uplink control channel formats to which the QCL association applies. In some cases, the at least one type of physical uplink control channel format is configured to include an acknowledgement, a negative acknowledgement, a scheduling request, or any combination thereof. In some cases, the at least one type of physical uplink control channel format is configured to transmit uplink control information with a range of payload sizes. In some cases, the at least one physical uplink control channel format type is configured for a first service type having a latency specification that is lower than a latency specification and a reliability specification that is higher than a reliability specification for a second service type and is not configured for the second service type.

In some examples, the QCL association configuration component 1110 may transmit the configuration message indicating at least one type of uplink control information of a set of different types of uplink control information to which the QCL association applies. In some cases, the at least one type of uplink control information is configured to include an acknowledgement, a negative acknowledgement, a scheduling request, or any combination thereof.

In some examples, the QCL association configuration component 1110 may transmit the configuration message indicating to apply the QCL association when the physical uplink control channel has a least a defined number of resource blocks.

In some examples, the QCL association configuration component 1110 may transmit the configuration message indicating at least one physical uplink control channel resource of a set of different physical uplink control channel resources to which the QCL association applies.

The transmission receiving component 1115 may receive, in accordance with the QCL association, the SRS transmission via an SRS resource and a control channel transmission via the physical uplink control channel.

The antenna port association configuration component 1125 may transmit a configuration message indicating an antenna port association between an SRS transmission and a physical uplink control channel. In some cases, the antenna port association indicates that a UE is to transmit the SRS transmission and the control channel transmission via a same antenna port. In some examples, the antenna port association configuration component 1125 may transmit the configuration message to configure a UE to maintain phase coherence between the SRS transmission and the control channel transmission. In some cases, the configuration message is transmitted via radio resource control signaling.

The antenna port association receiving component 1130 may receive, in accordance with the antenna port association, the SRS transmission via an SRS resource and a control channel transmission via the physical uplink control channel.

In some examples, the antenna port association receiving component 1130 may receive each of the SRS transmission and the control channel transmission within the defined amount of time. In some cases, the defined amount of time is based on a numerology.

The channel estimation component 1120 may determine a power delay profile for the physical layer uplink control channel from the SRS transmission. In some examples, the channel estimation component 1120 may determine a channel estimate for the physical uplink control channel based on the power delay profile. In some examples, the channel estimation component 1120 may demodulate the control channel transmission based on the channel estimate.

In some examples, the channel estimation component 1120 may determine a first channel estimate for the SRS transmission. In some examples, the channel estimation component 1120 may determine a second channel estimate for the physical uplink control channel based on the first channel estimate. In some examples, the channel estimation component 1120 may demodulate the control channel transmission based on the second channel estimate.

In some examples, the channel estimation component 1120 may determine the second channel estimate based on a relationship between a first transmission power of the SRS transmission and a second transmission power of the control channel transmission.

In some examples, the control channel transmission may be a scheduling request transmission indicating that the UE has uplink data available for transmission, and the relationship between the first transmission power and the second transmission power is based on the scheduling request transmission indicating that the UE has uplink data available for transmission.

In some examples, the channel estimation component 1120 may determine the second channel estimate based on a relationship between a first bandwidth of the SRS transmission and a second bandwidth of the control channel transmission.

In some cases, the control channel transmission is a scheduling request transmission indicating that the UE has uplink data available for transmission, and the relationship between the first bandwidth and the second bandwidth is based on the scheduling request transmission indicating that the UE has uplink data available for transmission.

The downlink control information transmitting component 1135 may transmit downlink control information to trigger transmission of the SRS transmission and the control channel transmission. In some cases, the SRS transmission is an aperiodic SRS transmission. In some cases, the downlink control information indicates an order in which to transmit the SRS transmission relative to the control channel transmission.

Figure 12:
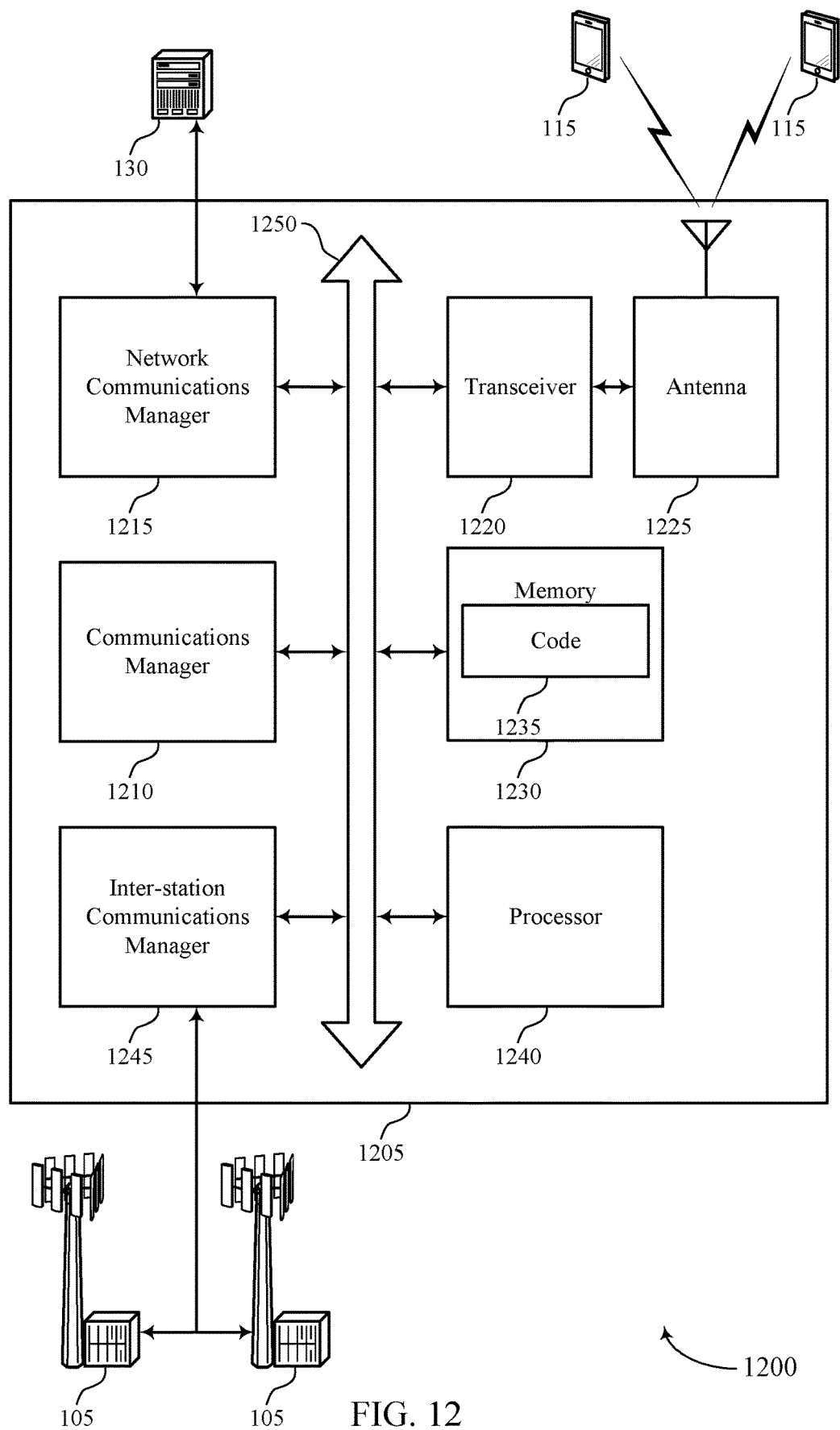
FIG. 12 shows a diagram of a system including a device that supports reference signal and uplink control channel association design in accordance with aspects of the present disclosure.

FIG. 12 shows a diagram of a system 1200 including a device 1205 that supports reference signal and uplink control channel association design in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit a configuration message indicating a QCL association between a physical uplink control channel and an SRS transmission for at least one time and frequency domain channel parameter and receive, in accordance with the QCL association, the SRS transmission via an SRS resource and a control channel transmission via the physical uplink control channel. The communications manager 1210 may also transmit a configuration message indicating an antenna port association between an SRS transmission and a physical uplink control channel and receive, in accordance with the antenna port association, the SRS transmission via an SRS resource and a control channel transmission via the physical uplink control channel.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting reference signal and uplink control channel association design).

The inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
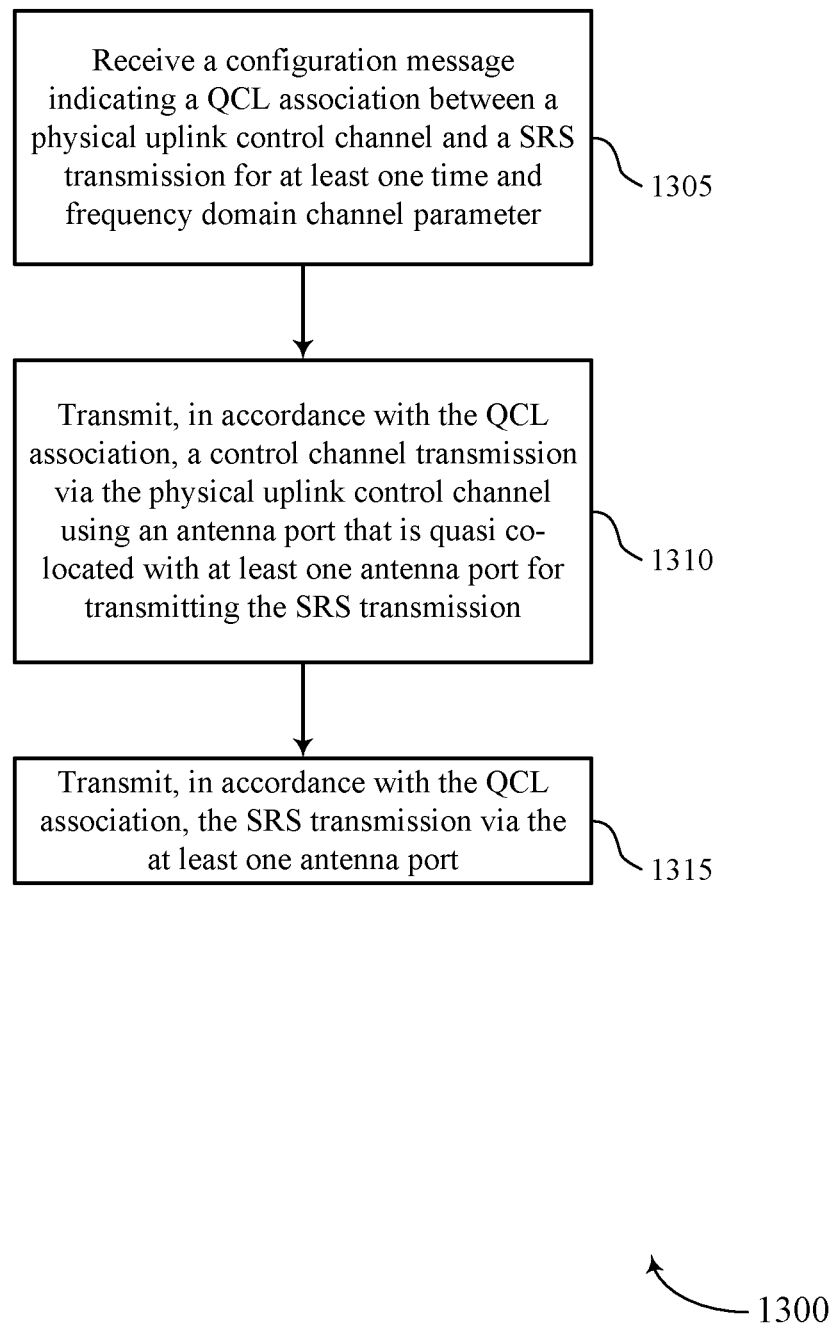
FIGS. 13 through 16 show flowcharts illustrating methods that support reference signal and uplink control channel association design in accordance with aspects of the present disclosure.

FIG. 13 shows a flowchart illustrating a method 1300 that supports reference signal and uplink control channel association design in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a configuration message indicating a QCL association between a physical uplink control channel and an SRS transmission for at least one time and frequency domain channel parameter. The operations of 1305 may be performed according to the methods described herein. In some examples, aspects of the operations of 1305 may be performed by a QCL association configuration component as described with reference to FIGS. 5 through 8.

At 1310, the UE may transmit, in accordance with the QCL association, a control channel transmission via the physical uplink control channel using an antenna port that is quasi co-located with at least one antenna port for transmitting the SRS transmission. The operations of 1310 may be performed according to the methods described herein. In some examples, aspects of the operations of 1310 may be performed by a PUCCH message component as described with reference to FIGS. 5 through 8.

At 1315, the UE may transmit, in accordance with the QCL association, the SRS transmission via the at least one antenna port. The operations of 1315 may be performed according to the methods described herein. In some examples, aspects of the operations of 1315 may be performed by an SRS transmission component as described with reference to FIGS. 5 through 8.

Figure 14:
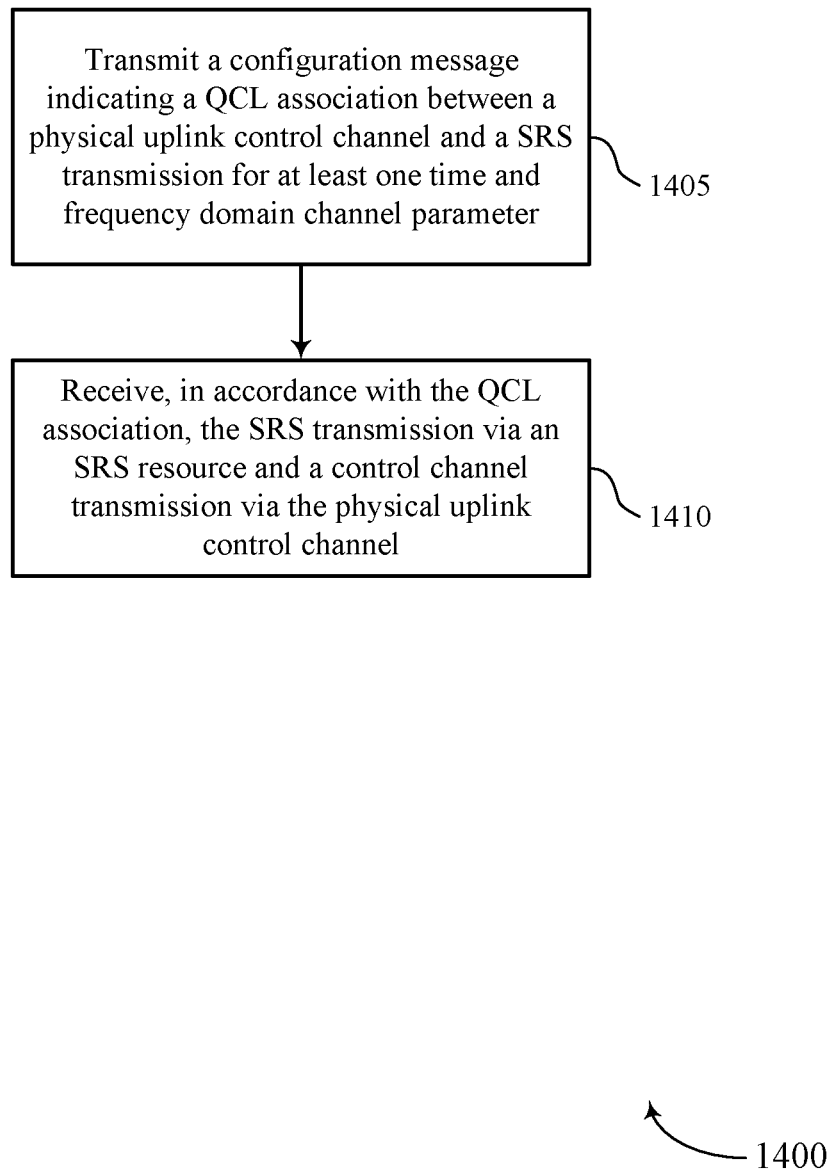

FIG. 14 shows a flowchart illustrating a method 1400 that supports reference signal and uplink control channel association design in accordance with aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1405, the base station may transmit a configuration message indicating a QCL association between a physical uplink control channel and an SRS transmission for at least one time and frequency domain channel parameter. The operations of 1405 may be performed according to the methods described herein. In some examples, aspects of the operations of 1405 may be performed by a QCL association configuration component as described with reference to FIGS. 9 through 12.

At 1410, the base station may receive, in accordance with the QCL association, the SRS transmission via an SRS resource and a control channel transmission via the physical uplink control channel. The operations of 1410 may be performed according to the methods described herein. In some examples, aspects of the operations of 1410 may be performed by a transmission receiving component as described with reference to FIGS. 9 through 12.

Figure 15:
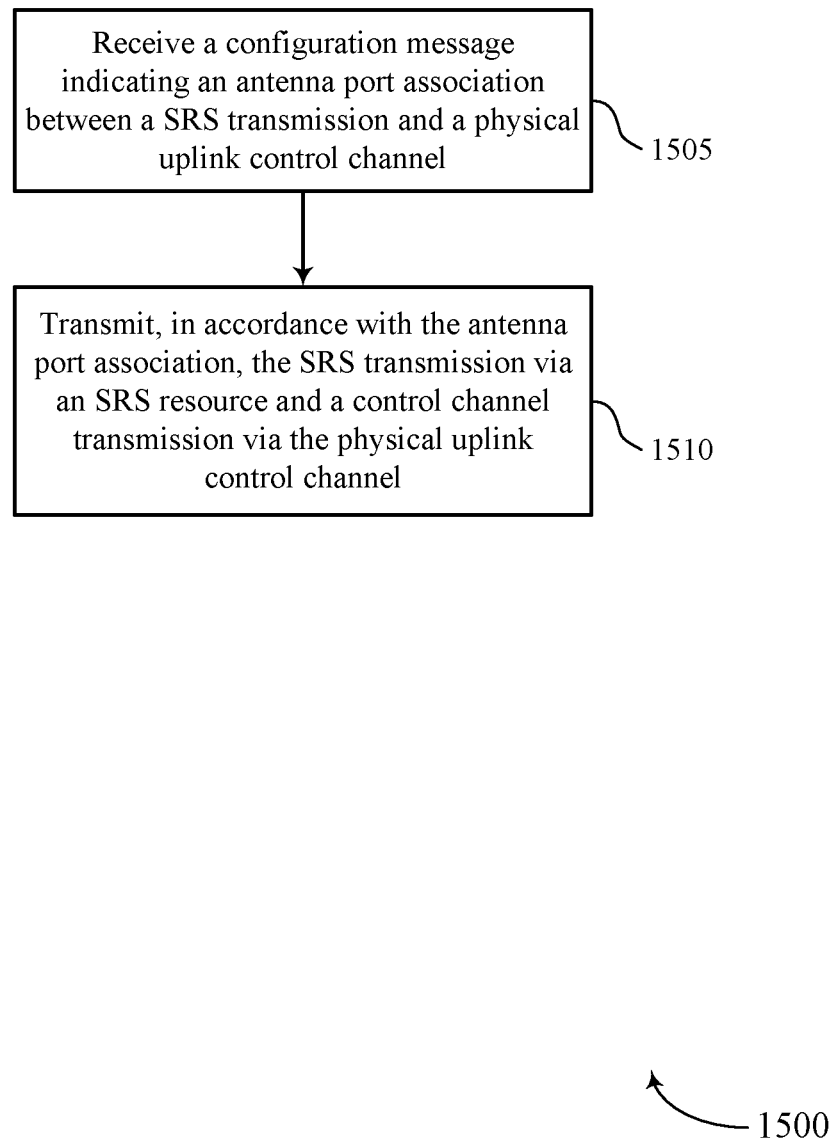

FIG. 15 shows a flowchart illustrating a method 1500 that supports reference signal and uplink control channel association design in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive a configuration message indicating an antenna port association between an SRS transmission and a physical uplink control channel. The operations of 1505 may be performed according to the methods described herein. In some examples, aspects of the operations of 1505 may be performed by an antenna port association configuration component as described with reference to FIGS. 5 through 8.

At 1510, the UE may transmit, in accordance with the antenna port association, the SRS transmission via an SRS resource and a control channel transmission via the physical uplink control channel. The operations of 1510 may be performed according to the methods described herein. In some examples, aspects of the operations of 1510 may be performed by an antenna port association transmitting component as described with reference to FIGS. 5 through 8.

Figure 16:
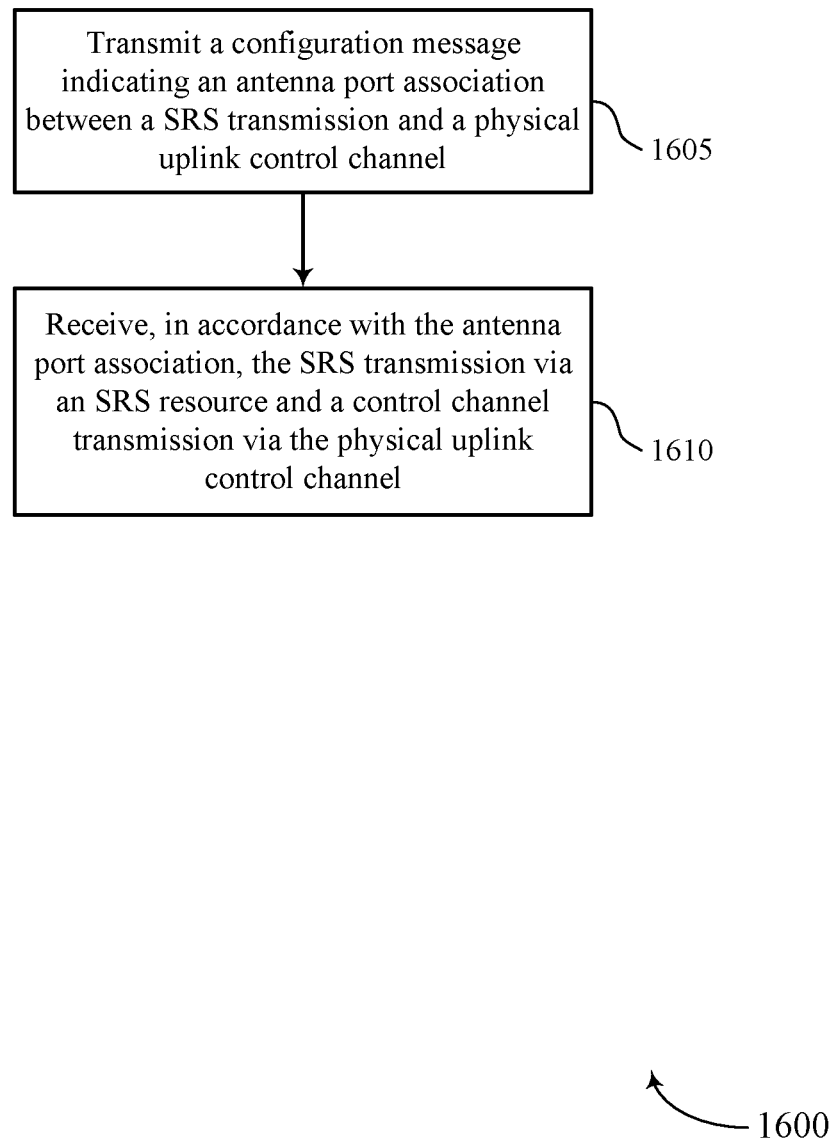

FIG. 16 shows a flowchart illustrating a method 1600 that supports reference signal and uplink control channel association design in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit a configuration message indicating an antenna port association between an SRS transmission and a physical uplink control channel. The operations of 1605 may be performed according to the methods described herein. In some examples, aspects of the operations of 1605 may be performed by an antenna port association configuration component as described with reference to FIGS. 9 through 12.

At 1610, the base station may receive, in accordance with the antenna port association, the SRS transmission via an SRS resource and a control channel transmission via the physical uplink control channel. The operations of 1610 may be performed according to the methods described herein. In some examples, aspects of the operations of 1610 may be performed by an antenna port association receiving component as described with reference to FIGS. 9 through 12.

Embodiment 1

A method for wireless communications at a user equipment (UE), comprising: receiving a configuration message indicating a quasi co-location (QCL) association between a physical uplink control channel and a sounding reference signal (SRS) transmission for at least one time and frequency domain channel parameter; transmitting, in accordance with the QCL association, a control channel transmission via the physical uplink control channel using an antenna port that is quasi co-located with at least one antenna port for transmitting the SRS transmission; and transmitting, in accordance with the QCL association, the SRS transmission via the at least one antenna port.

Embodiment 2

The method of embodiment 1, wherein receiving the configuration message further comprises: receiving the configuration message indicating a second QCL association between the SRS transmission and the physical uplink control channel for at least one spatial domain filter parameter, wherein the control channel transmission and the SRS transmission are each transmitted in accordance with the at least one spatial domain filter parameter.

Embodiment 3

The method of any of embodiments 1 to 2, wherein receiving the configuration message further comprises: receiving the configuration message indicating a second QCL association between a second SRS transmission and the physical uplink control channel for at least one spatial domain filter parameter, the second SRS transmission differing from the SRS transmission, wherein the control channel transmission and the second SRS transmission are each transmitted in accordance with the at least one spatial domain filter parameter.

Embodiment 4

The method of any of embodiments 1 to 3, wherein receiving the configuration message further comprises: receiving the configuration message indicating a first service type of a plurality of different service types to which the QCL association applies.

Embodiment 5

The method of embodiment 4, wherein the first service type has a latency specification that is lower than a latency specification and a reliability specification that is higher than a reliability specification for a second service type of the plurality of different service types.

Embodiment 6

The method of embodiment 4, wherein the first service type of the plurality of different service types is configured to have either a latency specification that is lower than a latency specification for a second service type, a reliability specification that is higher than a reliability specification for the second service type, or both.

Embodiment 7

The method of any of embodiments 1 to 6, wherein receiving the configuration message further comprises: receiving the configuration message indicating at least one type of physical uplink control channel format of a plurality of different types of physical uplink control channel formats to which the QCL association applies.

Embodiment 8

The method of embodiment 7, wherein the at least one type of physical uplink control channel format is configured to transmit uplink control information with a range of payload sizes.

Embodiment 9

The method of any of embodiments 7 to 8, wherein the at least one type of physical uplink control channel format is configured for a first service type having a latency specification that is lower than a latency specification and a reliability specification that is higher than a reliability specification for a second service type, and is not configured for the second service type.

Embodiment 10

The method of any of embodiments 1 to 9, wherein receiving the configuration message further comprises: receiving the configuration message indicating at least one type of uplink control information of a plurality of different types of uplink control information to which the QCL association applies.

Embodiment 11

The method of any of embodiments 1 to 10, wherein the at least one type of uplink control information is configured to include an acknowledgement, a negative acknowledgement, a scheduling request, or any combination thereof.

Embodiment 12

The method of any of embodiments 1 to 11, wherein receiving the configuration message further comprises: receiving the configuration message indicating to apply the QCL association when the physical uplink control channel has at least a defined number of resource blocks.

Embodiment 13

The method of any of embodiments 1 to 12, wherein receiving the configuration message further comprises: receiving the configuration message indicating at least one physical uplink control channel resource of a plurality of different physical uplink control channel resources to which the QCL association applies.

Embodiment 14

The method of embodiment 13, wherein the control message is an information element.

Embodiment 15

The method of any of embodiments 1 to 14, wherein the at least one time and frequency domain channel parameter includes at least one of a doppler shift, a doppler spread, an average delay, a delay spread, or any combination thereof.

Embodiment 16

The method of any of embodiments 1 to 15, wherein the configuration message is received via radio resource control signaling.

Embodiment 17

A method for wireless communications at a base station, comprising: transmitting a configuration message indicating a quasi co-location (QCL) association between a physical uplink control channel and a sounding reference signal (SRS) transmission for at least one time and frequency domain channel parameter; and receiving, in accordance with the QCL association, the SRS transmission via an SRS resource and a control channel transmission via the physical uplink control channel.

Embodiment 18

The method of embodiment 17, wherein receiving the configuration message comprises: receiving an antenna port association between the SRS resource and a physical uplink control channel resource; and transmitting, in accordance with the antenna port association, the SRS transmission on the SRS resource and the control channel transmission on the PUCCH resource.

Embodiment 19

The method of any of embodiments 17 to 18, further comprising: determining a power delay profile for the physical layer uplink control channel from the SRS transmission; determining a channel estimate for the physical uplink control channel based at least in part on the power delay profile; and demodulating the control channel transmission based at least in part on the channel estimate.

Embodiment 20

The method of any of embodiments 17 to 19, wherein transmitting the configuration message further comprises: transmitting the configuration message indicating a second QCL association between the SRS transmission and the physical uplink control channel for at least one spatial domain filter parameter.

Embodiment 21

The method of any of embodiments 17 to 20, wherein transmitting the configuration message further comprises: transmitting the configuration message indicating a second QCL association between the SRS transmission and the physical uplink control channel for at least one spatial domain filter parameter.

Embodiment 22

The method of any of embodiments 17 to 21, wherein transmitting the configuration message further comprises: transmitting the configuration message indicating a second QCL association between a second SRS transmission and the physical uplink control channel for at least one spatial domain filter parameter, the second SRS transmission differing from the SRS transmission.

Embodiment 23

The method of any of embodiments 17 to 20, wherein transmitting the configuration message further comprises: transmitting the configuration message indicating a first service type of a plurality of different service types to which the QCL association applies.

Embodiment 24

The method of embodiment 23, wherein the first service type has a latency specification that is lower than a latency specification and a reliability specification that is higher than a reliability specification for a second service type of the plurality of different service types.

Embodiment 25

The method of any embodiments 17 to 24, wherein transmitting the configuration message further comprises: transmitting the configuration message indicating at least one type of physical uplink control channel format of a plurality of different types of physical uplink control channel formats to which the QCL association applies.

Embodiment 26

The method of embodiment 25, wherein the at least one type of physical uplink control channel format is configured to include an acknowledgement, a negative acknowledgement, a scheduling request, or any combination thereof.

Embodiment 27

The method of any of embodiments 25 to 26, wherein the at least one physical uplink control channel format type is configured for a first service type having a latency specification that is lower than a latency specification and a reliability specification that is higher than a reliability specification for a second service type, and is not configured for the second service type.

Embodiment 28

The method of any of embodiments 17 to 27, wherein transmitting the configuration message further comprises: transmitting the configuration message indicating at least one type of uplink control information of a plurality of different types of uplink control information to which the QCL association applies.

Embodiment 29

The method of embodiment 28, wherein the at least one type of uplink control information is configured to include an acknowledgement, a negative acknowledgement, a scheduling request, or any combination thereof.

Embodiment 30

The method of any of embodiments 17 to 29, wherein transmitting the configuration message further comprises: transmitting the configuration message indicating to apply the QCL association when the physical uplink control channel has a least a defined number of resource blocks.

Embodiment 31

The method of any of embodiments 17 to 30, wherein transmitting the configuration message further comprises: transmitting the configuration message indicating to apply the QCL association when the physical uplink control channel has a least a defined number of resource blocks.

Embodiment 32

The method of any of embodiments 17 to 31, wherein transmitting the configuration message further comprises: transmitting the configuration message indicating at least one physical uplink control channel resource of a plurality of different physical uplink control channel resources to which the QCL association applies.

Embodiment 33

The method of any of embodiments 17 to 32, wherein the at least one time and frequency domain channel parameter includes at least one of a doppler shift, a doppler spread, an average delay, a delay spread, or any combination thereof.

Embodiment 34

The method of any of embodiments 17 to 33, wherein the configuration message is transmitted via radio resource control signaling.

Embodiment 35

The method of any of embodiments 17 to 34, wherein the at least one time and frequency domain channel parameter is a large-scale time and frequency domain channel parameter.

Embodiment 36

A method for wireless communications at a user equipment (UE), comprising: receiving a configuration message indicating an antenna port association between a sounding reference signal (SRS) transmission and a physical uplink control channel; and transmitting, in accordance with the antenna port association, the SRS transmission via an SRS resource and a control channel transmission via the physical uplink control channel.

Embodiment 37

The method of embodiment 36, wherein receiving the configuration message comprises: receiving the configuration message to configure the UE to maintain phase coherence between the SRS transmission and the control channel transmission.

Embodiment 38

The method of any of embodiments 36 to 37 wherein the antenna port association indicates that the UE is to transmit the SRS transmission and the control channel transmission via a same antenna port, and wherein the transmitting further comprises: transmitting the SRS transmission and the control channel transmission via the same antenna port.

Embodiment 39

The method of embodiment 38, wherein each of the SRS transmission and the control channel transmission are transmitted via the same antenna port within a defined amount of time.

Embodiment 40

The method of any of embodiments 38 to 39 the defined amount of time is based at least in part on a numerology.

Embodiment 41

The method of any of embodiments 36 to 40, wherein the transmitting further comprises: transmitting the SRS transmission using a first transmission power and the control channel transmission using a second transmission power, wherein a difference between the first transmission power and the second transmission power satisfies a threshold.

Embodiment 42

The method of embodiment 41, wherein transmitting the SRS transmission using the first transmission power and the control channel transmission using the second transmission power further comprises: adjusting the first transmission power to make the difference between the first transmission power and the second transmission power satisfy the threshold.

Embodiment 43

The method of embodiment 42, wherein the control channel transmission is a scheduling request transmission indicating that the UE has uplink data available for transmission, and the adjusting the first transmission power is based at least in part on the scheduling request transmission indicating that the UE has uplink data available for transmission.

Embodiment 44

The method of any of embodiments 36 to 43, wherein the transmitting further comprises: transmitting the SRS transmission using a first bandwidth and the control channel transmission using a second bandwidth, wherein a difference between the first bandwidth and the second bandwidth satisfies a threshold.

Embodiment 45

The method of any of embodiments 36 to 44: The method of embodiment 40, wherein transmitting the SRS transmission using the first bandwidth and the control channel transmission using the second bandwidth further comprises: adjusting the first bandwidth to make the difference between the first bandwidth and the second bandwidth satisfy the threshold.

Embodiment 46

The method of any of embodiments 36 to 45, wherein transmitting the SRS transmission and the control channel transmission in accordance with the antenna port association is based at least in part on the downlink control information triggering transmission of the SRS transmission and the control channel transmission.

Embodiment 47

The method of embodiment 46, wherein the control channel transmission is a scheduling request transmission indicating that the UE has uplink data available for transmission, and the adjusting the first bandwidth is based at least in part on the scheduling request transmission indicating that the UE has uplink data available for transmission.

Embodiment 48

The method of any of embodiments 36 to 47, further comprising: receiving downlink control information that triggers transmission of the SRS transmission and the control channel transmission.

Embodiment 49

The method of embodiment 48, wherein: transmitting the SRS transmission and the control channel transmission in accordance with the antenna port association is based at least in part on the downlink control information triggering transmission of the SRS transmission and the control channel transmission.

Embodiment 50

The method of embodiment 48, wherein the downlink control information triggering both the SRS transmission and the control channel transmission indicates the antenna port association to the UE.

Embodiment 51

The method of any of embodiments 48 to 50, wherein the downlink control information indicates an order in which to transmit the SRS transmission relative to the control channel transmission.

Embodiment 52

The method of any of embodiments 48 to 51, wherein the SRS transmission is an aperiodic SRS transmission.

Embodiment 53

The method of any of embodiments 48 to 52, wherein the configuration message is received via radio resource control signaling.

Embodiment 54

The method of any of embodiments 36 to 53, wherein receiving the configuration message comprises: receiving an antenna port association between the SRS resource and a physical uplink control channel resource; and transmitting, in accordance with the antenna port association, the SRS transmission on the SRS resource and the control channel transmission on the PUCCH resource

Embodiment 55

The method of any of embodiments 36 to 54, further comprising: identifying that an uplink transmission or a downlink transmission occurs between a second SRS transmission and a second control channel transmission; determining not to apply the antenna port association based at least in part on the identifying; and transmitting the second SRS transmission and the second control channel transmission based at least in part on the determining

Embodiment 56

A method for wireless communication at a base station comprising: transmitting a configuration message indicating an antenna port association between a sounding reference signal (SRS) transmission and a physical uplink control channel; and receiving, in accordance with the antenna port association, the SRS transmission via an SRS resource and a control channel transmission via the physical uplink control channel.

Embodiment 57

The method of embodiment 56, wherein transmitting the configuration message comprises: transmitting the configuration message to configure a user equipment (UE) to maintain phase coherence between the SRS transmission and the control channel transmission.

Embodiment 58

The method of any of embodiments 56 to 57, further comprising: determining a first channel estimate for the SRS transmission; determining a second channel estimate for the physical uplink control channel based at least in part on the first channel estimate; and demodulating the control channel transmission based at least in part on the second channel estimate.

Embodiment 59

The method of embodiment 58, wherein determining the second channel estimate further comprises: determining the second channel estimate based at least in part on a relationship between a first transmission power of the SRS transmission and a second transmission power of the control channel transmission.

Embodiment 60

The method of any of embodiments 56 to 59, wherein the control channel transmission is a scheduling request transmission indicating that a user equipment (UE) has uplink data available for transmission, and the relationship between the first transmission power and the second transmission power is based at least in part on the scheduling request transmission indicating that the UE has uplink data available for transmission.

Embodiment 61

The method of any of embodiments 56 to 60, wherein determining the second channel estimate further comprises: determining the second channel estimate based at least in part on a relationship between a first bandwidth of the SRS transmission and a second bandwidth of the control channel transmission.

Embodiment 62

The method of embodiment 61 wherein the control channel transmission is a scheduling request transmission indicating that a user equipment (UE) has uplink data available for transmission, and the relationship between the first bandwidth and the second bandwidth is based at least in part on the scheduling request transmission indicating that the UE has uplink data available for transmission.

Embodiment 63

The method of any of embodiments 56 to 62, wherein the antenna port association indicates that a user equipment (UE) is to transmit the SRS transmission and the control channel transmission via a same antenna port.

Embodiment 64

The method of any of embodiments 56 to 63, wherein the antenna port association indicates that a user equipment (UE) is to transmit the SRS transmission and the control channel transmission via a same antenna port within a defined amount of time, and wherein the receiving further comprises: receiving each of the SRS transmission and the control channel transmission within the defined amount of time.

Embodiment 65

The method of embodiment 64, wherein the defined amount of time is based at least in part on a numerology.

Embodiment 66

The method of any of embodiments 56 to 65, further comprising: transmitting downlink control information to trigger transmission of the SRS transmission and the control channel transmission.

Embodiment 67

The method of embodiment 66, wherein the SRS transmission is an aperiodic SRS transmission.

Embodiment 68

The method of any of embodiments 66 to 67, wherein the downlink control information indicates an order in which to transmit the SRS transmission relative to the control channel transmission.

Embodiment 69

The method of any of embodiments 66 to 68, wherein the configuration message is transmitted via radio resource control signaling.

Embodiment 70

An apparatus for wireless communications comprising a processor; memory in electronic communication with the processor; and instructions stored in the memory and executable by the processor to cause the apparatus to perform a method of any of embodiments 1 to 16.

Embodiment 71

An apparatus for wireless communications comprising a processor; memory in electronic communication with the processor; and instructions stored in the memory and executable by the processor to cause the apparatus to perform a method of any of embodiments 17 to 35.

Embodiment 72

An apparatus for wireless communications comprising a processor; memory in electronic communication with the processor; and instructions stored in the memory and executable by the processor to cause the apparatus to perform a method of any of embodiments 36 to 55.

Embodiment 73

An apparatus for wireless communications comprising a processor; memory in electronic communication with the processor; and instructions stored in the memory and executable by the processor to cause the apparatus to perform a method of any of embodiments 56 to 69.

Embodiment 74

An apparatus comprising at least one means for performing a method of any of embodiments 1 to 16.

Embodiment 75

An apparatus comprising at least one means for performing a method of any of embodiments 17 to 35.

Embodiment 76

An apparatus comprising at least one means for performing a method of any of embodiments 36 to 55.

Embodiment 77

An apparatus comprising at least one means for performing a method of any of embodiments 56 to 69.

Embodiment 78

A non-transitory computer-readable medium storing code for wireless communications, the code comprising instructions executable by a processor to perform a method of any of embodiments 1 to 16.

Embodiment 79

A non-transitory computer-readable medium storing code for wireless communications, the code comprising instructions executable by a processor to perform a method of any of embodiments 17 to 35.

Embodiment 80

A non-transitory computer-readable medium storing code for wireless communications, the code comprising instructions executable by a processor to perform a method of any of embodiments 36 to 55.

Embodiment 81

A non-transitory computer-readable medium storing code for wireless communications, the code comprising instructions executable by a processor to perform a method of any of embodiments 56 to 69.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a configuration message indicating a first quasi co-location (QCL) association between a physical uplink control channel and an uplink sounding reference signal (SRS) transmission for at least one time and frequency domain channel parameter and a second QCL association between the physical uplink control channel and the uplink SRS transmission;
   transmitting, in accordance with the first QCL association or the second QCL association, a control channel transmission via the physical uplink control channel using an antenna port that is quasi co-located with at least one antenna port for transmitting the uplink SRS transmission; and
   transmitting, in accordance with the first QCL association or the second QCL association, the uplink SRS transmission via the at least one antenna port.

2. The method of claim 1, wherein receiving the configuration message further comprises:
   receiving the configuration message indicating the second QCL association between the uplink SRS transmission and the physical uplink control channel for at least one spatial domain filter parameter, wherein the control channel transmission and the uplink SRS transmission are each transmitted in accordance with the at least one spatial domain filter parameter.

3. The method of claim 1, wherein receiving the configuration message further comprises:
   receiving the configuration message indicating the second QCL association between a second SRS transmission and the physical uplink control channel for at least one spatial domain filter parameter, the second SRS transmission differing from the uplink SRS transmission, wherein the control channel transmission and the second SRS transmission are each transmitted in accordance with the at least one spatial domain filter parameter.

4. The method of claim 1, wherein receiving the configuration message further comprises:
   receiving the configuration message indicating a first service type of a plurality of different service types to which the first QCL association or the second QCL association applies.

5. The method of claim 4, wherein the first service type of the plurality of different service types is configured to have either a latency specification that is lower than a latency specification for a second service type, a reliability specification that is higher than a reliability specification for the second service type, or both.

6. The method of claim 1, wherein receiving the configuration message further comprises:
   receiving the configuration message indicating at least one type of physical uplink control channel format of a plurality of different types of physical uplink control channel formats to which the first QCL association or the second QCL association applies.

7. The method of claim 6, wherein the at least one type of physical uplink control channel format is configured to transmit uplink control information with a range of payload sizes.

8. The method of claim 1, wherein receiving the configuration message further comprises:
   receiving the configuration message indicating at least one type of uplink control information of a plurality of different types of uplink control information to which the first QCL association or the second QCL association applies.

9. The method of claim 8, wherein the at least one type of uplink control information is configured to include an acknowledgement, a negative acknowledgement, a scheduling request, or any combination thereof.

10. The method of claim 1, wherein receiving the configuration message further comprises:
    receiving the configuration message indicating to apply the first QCL association or the second QCL association when the physical uplink control channel has at least a defined number of resource blocks.

11. The method of claim 1, wherein receiving the configuration message further comprises:
    receiving the configuration message indicating at least one physical uplink control channel resource of a plurality of different physical uplink control channel resources to which the first QCL association or the second QCL association applies.

12. The method of claim 1, wherein the at least one time and frequency domain channel parameter includes at least one of a doppler shift, a doppler spread, an average delay, a delay spread, or any combination thereof.

13. The method of claim 1, wherein the at least one time and frequency domain channel parameter is a large-scale time and frequency domain channel parameter.

14. A method for wireless communication at a network device, comprising:
transmitting a configuration message indicating a first quasi co-location (QCL) association between a physical uplink control channel and an uplink sounding reference signal (SRS) transmission for at least one time and frequency domain channel parameter and a second QCL association between the physical uplink control channel and the uplink SRS transmission; and
receiving, in accordance with the first QCL association or the second QCL association, the uplink SRS transmission via an SRS resource and a control channel transmission via the physical uplink control channel.

15. A method for wireless communication at a user equipment (UE), comprising:
receiving a configuration message indicating an antenna port association between an uplink sounding reference signal (SRS) transmission and a physical uplink control channel, wherein the antenna port association indicates that the UE is to transmit, via a same antenna port, the uplink SRS transmission and a control channel transmission via the physical uplink control channel; and
transmitting, in accordance with the antenna port association and via the same antenna port, the uplink SRS transmission via an SRS resource and the control channel transmission via the physical uplink control channel.

16. The method of claim 15, wherein receiving the configuration message comprises:
receiving an antenna port association between the SRS resource and a physical uplink control channel resource; and
transmitting, in accordance with the antenna port association, the uplink SRS transmission on the SRS resource and the control channel transmission on the physical uplink control channel resource.

17. The method of claim 15, wherein receiving the configuration message comprises:
receiving the configuration message to configure the UE to maintain phase coherence between the uplink SRS transmission and the control channel transmission.

18. The method of claim 15, wherein each of the uplink SRS transmission and the control channel transmission are transmitted via the same antenna port within a defined amount of time.

19. The method of claim 18, wherein the defined amount of time is based at least in part on a numerology.

20. The method of claim 15, wherein the transmitting further comprises:
transmitting the uplink SRS transmission using a first transmission power and the control channel transmission using a second transmission power, wherein a difference between the first transmission power and the second transmission power satisfies a threshold.

21. The method of claim 20, wherein transmitting the uplink SRS transmission using the first transmission power and the control channel transmission using the second transmission power further comprises:
adjusting the first transmission power to make the difference between the first transmission power and the second transmission power satisfy the threshold.

22. The method of claim 15, wherein the transmitting further comprises:
transmitting the uplink SRS transmission using a first bandwidth and the control channel transmission using a second bandwidth, wherein a difference between the first bandwidth and the second bandwidth satisfies a threshold.

23. The method of claim 15, further comprising:
receiving downlink control information that triggers transmission of the uplink SRS transmission and the control channel transmission.

24. The method of claim 23, wherein:
transmitting the uplink SRS transmission and the control channel transmission in accordance with the antenna port association is based at least in part on the downlink control information triggering transmission of the uplink SRS transmission and the control channel transmission.

25. The method of claim 24, wherein the downlink control information triggering both the uplink SRS transmission and the control channel transmission indicates the antenna port association to the UE.

26. The method of claim 25, wherein the downlink control information indicates an order in which to transmit the uplink SRS transmission relative to the control channel transmission.

27. The method of claim 25, wherein the uplink SRS transmission is an aperiodic SRS transmission.

28. The method of claim 15, further comprising:
identifying that an uplink transmission or a downlink transmission occurs between a second SRS transmission and a second control channel transmission;
determining not to apply the antenna port association based at least in part on the identifying; and
transmitting the second SRS transmission and the second control channel transmission based at least in part on the determining.

29. A method for wireless communication at a network device, comprising:
transmitting a configuration message indicating an antenna port association between an uplink sounding reference signal (SRS) transmission and a physical uplink control channel, wherein the antenna port association indicates a same antenna port to be used for the uplink SRS transmission and a control channel transmission via the physical uplink control channel; and
receiving, in accordance with the antenna port association indicating the same antenna port, the uplink SRS transmission via an SRS resource and the control channel transmission via the physical uplink control channel.

30. An apparatus for wireless communication at a user equipment (UE), comprising:
a processor; and
memory coupled with the processor, the processor configured to:
receive a configuration message indicating a first quasi co-location (QCL) association between a physical uplink control channel and an uplink sounding reference signal (SRS) transmission for at least one time and frequency domain channel parameter and a second QCL association between the physical uplink control channel and the uplink SRS transmission;
transmit, in accordance with the first QCL association or the second QCL association, a control channel transmission via the physical uplink control channel using an antenna port that is quasi co-located with at least one antenna port for transmitting the uplink SRS transmission; and
transmit, in accordance with the first QCL association or the second QCL association, the uplink SRS transmission via the at least one antenna port.

31. An apparatus for wireless communication at a network device, comprising:
- a processor; and
- memory coupled with the processor, the processor configured to:
  - transmit a configuration message indicating a first quasi co-location (QCL) association between a physical uplink control channel and an uplink sounding reference signal (SRS) transmission for at least one time and frequency domain channel parameter and a second QCL association between the physical uplink control channel and the uplink SRS transmission; and
  - receive, in accordance with the first QCL association or the second QCL association, the uplink SRS transmission via an SRS resource and a control channel transmission via the physical uplink control channel.

32. An apparatus for wireless communication at a user equipment (UE), comprising:
- a processor; and
- memory coupled with the processor, the processor configured to:
  - receive a configuration message indicating an antenna port association between an uplink sounding reference signal (SRS) transmission and a physical uplink control channel, wherein the antenna port association indicates that the UE is to transmit, via a same antenna port, the uplink SRS transmission and a control channel transmission via the physical uplink control channel; and
  - transmit, in accordance with the antenna port association and via the same antenna port, the uplink SRS transmission via an SRS resource and the control channel transmission via the physical uplink control channel.

33. An apparatus for wireless communication at a network device, comprising:
- a processor; and
- memory coupled with the processor, the processor configured to:
  - transmit a configuration message indicating an antenna port association between an uplink sounding reference signal (SRS) transmission and a physical uplink control channel, wherein the antenna port association indicates a same antenna port to be used for the uplink SRS transmission and a control channel transmission via the physical uplink control channel; and
  - receive, in accordance with the antenna port association indicating the same antenna port, the uplink SRS transmission via an SRS resource and the control channel transmission via the physical uplink control channel.

* * * * *